US012324478B2

(12) United States Patent
Nottebaere

(10) Patent No.: US 12,324,478 B2
(45) Date of Patent: Jun. 10, 2025

(54) TRANSLATABLE DAMPING SYSTEM FOR ITEM, WITH LEAF SPRING

(71) Applicant: Vincent Nottebaere, Villeneuve d'Ascq (FR)

(72) Inventor: Vincent Nottebaere, Villeneuve d'Ascq (FR)

( * ) Notice: Subject to any disclaimer, the term of this patent is extended or adjusted under 35 U.S.C. 154(b) by 0 days.

(21) Appl. No.: 18/555,393

(22) PCT Filed: Apr. 4, 2022

(86) PCT No.: PCT/FR2022/050625
§ 371 (c)(1),
(2) Date: Oct. 13, 2023

(87) PCT Pub. No.: WO2022/223899
PCT Pub. Date: Oct. 27, 2022

(65) Prior Publication Data
US 2024/0206589 A1  Jun. 27, 2024

(30) Foreign Application Priority Data

Apr. 20, 2021 (FR) ........................................ 2104078
Dec. 9, 2021 (FR) ...................................... 21132535

(51) Int. Cl.
*A43B 13/18* (2006.01)
*A43B 13/28* (2006.01)
(52) U.S. Cl.
CPC ............ *A43B 13/183* (2013.01); *A43B 13/18* (2013.01); *A43B 13/28* (2013.01)
(58) Field of Classification Search
CPC ...... A43B 13/183; A43B 13/18; A43B 13/184

USPC ....................................................... 36/7.8, 27
See application file for complete search history.

(56) References Cited

U.S. PATENT DOCUMENTS

| 427,136 | A | * | 5/1890 | Walker | A43B 13/183 |
| | | | | | 36/7.8 |
| 1,571,073 | A | | 1/1926 | Tapling | |
| 2,413,545 | A | * | 12/1946 | Leander | A43B 13/18 |
| | | | | | 273/DIG. 18 |
| 3,219,358 | A | * | 11/1965 | Hagner | A63B 25/10 |
| | | | | | 36/7.8 |
| 3,444,631 | A | * | 5/1969 | MacLeod | A63B 25/10 |
| | | | | | 36/7.8 |

(Continued)

FOREIGN PATENT DOCUMENTS

| DE | 19836515 A1 | 2/1999 |
| DE | 202007011464 U1 | 10/2007 |

(Continued)

OTHER PUBLICATIONS

International Search Report from International Application No. PCT/FR2022/050625 dated Aug. 25, 2022, 3 pgs.

*Primary Examiner* — Marie D Bays
(74) *Attorney, Agent, or Firm* — Tutunjian & Bitetto, P.C.

(57) ABSTRACT

The present invention relates to a damping system for an article including a rigid support having at least one reception face extending along a plane, and a spring blade including a first end and a second end. A first means of assembling the article includes a first end with the rigid support. The blade extends along the rigid support on a convex path so that said second end is put in contact with said reception face and is able to move in said plane during compression and/or relaxation of said blade.

21 Claims, 12 Drawing Sheets

(56) References Cited

U.S. PATENT DOCUMENTS

| | | | | |
|---|---|---|---|---|
| 4,492,374 A * | 1/1985 | Lekhtman | ............... | A63B 25/10 267/28 |
| 4,638,575 A * | 1/1987 | Illustrato | ................ | A43B 21/30 36/38 |
| 4,843,737 A * | 7/1989 | Vorderer | ................ | A43B 21/30 36/38 |
| 5,138,776 A * | 8/1992 | Levin | ..................... | A63B 25/10 36/38 |
| 5,871,298 A * | 2/1999 | Lekhtman | ............ | A43B 13/183 482/79 |
| 5,916,071 A * | 6/1999 | Lee | ...................... | A43B 13/182 482/79 |
| 6,318,001 B1 * | 11/2001 | Lee | ........................ | A63B 25/10 482/79 |
| 6,436,012 B1 * | 8/2002 | Naville | ................ | A43B 13/182 482/121 |
| 6,712,395 B1 * | 3/2004 | Lee | ........................ | A63C 17/02 280/11.26 |
| 6,722,670 B1 * | 4/2004 | Lee | ...................... | A43B 13/184 280/11.19 |
| 7,950,166 B1 * | 5/2011 | Perenich | .............. | A43B 13/182 36/31 |
| 2006/0065499 A1 * | 3/2006 | Smaldone | ............ | A43B 13/183 267/141 |
| 2008/0256830 A1 * | 10/2008 | Frederick | ................ | A43B 21/26 36/155 |
| 2011/0047827 A1 * | 3/2011 | Diekman | ................ | A63B 25/10 36/27 |
| 2013/0125422 A1 * | 5/2013 | Perenich | ................ | A43B 13/182 36/102 |
| 2016/0302521 A1 * | 10/2016 | Rennex | ..................... | A43B 13/184 |
| 2020/0378462 A1 * | 12/2020 | Rennex | ................ | A43B 13/183 |
| 2021/0022442 A1 * | 1/2021 | Lee | ........................ | A63B 25/10 |
| 2022/0354215 A1 * | 11/2022 | Liang | ................... | A43B 13/184 |

FOREIGN PATENT DOCUMENTS

| | | |
|---|---|---|
| EP | 2073906 A1 | 7/2009 |
| GB | 2030267 A | 4/1980 |

* cited by examiner

TRANSLATABLE DAMPING SYSTEM FOR ITEM, WITH LEAF SPRING

TECHNICAL FIELD

The present invention relates to the field of damping systems.

The present invention relates more particularly to a simplified compact damping system able to be incorporated in a variety of articles to improve the comfort, damping or flexibility thereof or to provide additional bounce propulsion.

Damping system, within the meaning of the present invention, means throughout the following description a system including one or more elastic or spring elements making it possible both to damp shocks by compression of the element and to generate a force accompanying the relaxation movement of the element.

The present invention will thus find numerous advantageous applications in the field of damping systems, and in particular in incorporating damping systems in articles of the footwear type, for example shoes or boots, but also in incorporating damping systems in a wide variety of saddlery articles, vehicles, etc.

PRIOR ART

The Applicant observes that some solutions in the development of footwear articles, in particular bounce sport footwear of the Kangoo Jumps® type, make it possible to couple to the sole of the article a damping system for modifying walking, running or sporting practice.

Such a damping system comprises a spring element, for example one or more spring blades, compressing under the weight of the user and reducing the shocks transmitted, in particular to their vertebral column, the relaxation of the spring generating a propulsion force improving the performances of the user, in particular jumping, and reducing the efforts necessary to make normal movements. Apart from sporting activities, these solutions are thus particularly attractive for assisting persons of reduced mobility, in particular persons in rehabilitation.

The Applicant observes that the solutions proposed at the present time have a plurality of limitations.

In particular, the systems currently proposed are particularly bulky and are restricted solely to use in conjunction with specialist shoes adapted to the damping system. The use of such shoes consequently effects the behaviour of the user considerably and cannot be done daily with comfort, and the use thereof is therefore limited to sporting practice over short periods.

The Applicant also observes that such specialist shoes are produced from rigid materials for controlling the forces resulting from the compression and relaxation of the spring element. This design also greatly reduces the comfort of the user, since rigid shoes cannot adapt to the morphology and/or to the movements of the user. The possibilities of walking or running using shoes incorporating such damping systems are consequently reduced, since the foot of the user and in particular their ankle are interfered with by the structure of the shoe.

The Applicant consequently submits that there is at the present time no satisfactory alternative damping-system solution able to be used daily for improving the walking comfort of the user and also to facilitate sporting activities of long duration.

SUMMARY OF THE INVENTION

The present invention aims to improve the current situation described above.

The present invention aims more particularly to remedy the above drawbacks by proposing a damping system for an article having sufficient compactness to be integrated without difficulty in an article of the footwear article type and facilitating walking movements while providing improved balance and propulsion for the user.

For this purpose, the object of the present invention relates, in a first aspect, to a damping system for an article, the system including:
- a rigid support having at least one face, referred to as the reception face, extending in a plane; and
- a spring blade including a first end and a second end, the blade having a curved shape between the ends.

In other words, the spring blade has a curve at rest, the deformation of the spring blade by increasing or reducing the curving generating a contrary return force. On the other hand, the rigid support is resistant to deformations, ideally sized so as to resist a force equal to the maximum return force that can be generated by the spring blade.

The spring blade is for example sized so as to allow reversible deformation thereof according to an angular range corresponding to the area of use of the spring blade, the extreme positions of this angular range being associated with a maximum return force, the rigid support not deforming, or only a little, under a force equal to the maximum return force.

Obviously, the properties of rigidity of the support and/or of elasticity of the spring blade are specific to an axis of application of the forces. The support is for example sized so as to have greater resistance to deformations along an axis, for example an axis perpendicular to the plane of the reception face. At the same time, the spring blade is for example sized so as to have resistance to longitudinal forces and to lateral twisting in order to avoid deformations of the blade other than a change in the curvature thereof.

A person skilled in the art additionally understands that the materials of the support and of the spring blade are selected conjointly with the sizing thereof. For example, a support is provided having a composite structure including an alveolar core made from plastics material covered with a layer of wood or of Kevlar®.

Advantageously, the system includes first means of assembling the first end with the support, the blade extending along the support on a convex path so that the second end is put in contact with the reception face and is able to move in the plane during compression and/or relaxation of the blade.

In other words, the means of assembling the first end with the support, referred to as first assembly means, make it possible to associate the blade and the support at the first end, the second end being free. This design favours the transmission of return forces of the blade towards the support at the first end and consequently generates a thrust coming from the first end with respect to a weight more or less uniformly distributed on the support or on an intermediate portion of the blade.

It will be understood here that the first assembly means allow a movement of the blade with respect to the support, preferably on a pivot connection. The first assembly means allow for example the rotation of the first end with respect to the support on a first axis, for example a first axis of the plane of the reception face, or in a plane parallel to the plane of the reception face, the second end moving on a second axis perpendicular to the first axis and included in the plane of the reception face.

It will additionally be understood that associating the blade and the support makes it possible to define a position of maximum compression of the blade, wherein the blade is pressed against the support. In for example sizing the blade and the support and selecting the materials thereof, account is taken of an extreme position defined by the pressing of the blade against the support.

By virtue of the present invention, the damping system can be implemented with a single spring blade compressing and relaxing along a support plane, thus generating return forces generating a thrust in a defined direction, the damping system having a more compact design that is simple to incorporate in an article, in particular to incorporate in a sole of a footwear article.

In an advantageous embodiment of the invention, the damping system comprises means for holding the second end in contact with the reception face.

It will be understood here that the holding means prevent the detachment of the second end on the reception face, or more generally limit the mobility of the spring blade to the movements of compression and relaxation against the support. This design prevents the introduction of foreign bodies between the second end and the reception face, as well as any turning of the spring blade with respect to the support, for example by rotation about the first assembly means.

Preferably, the holding means include a first elastic reinforcement assembled with the support and an intermediate portion of the blade.

In other words, the first elastic reinforcement provides, in any situation, a minimum force holding the second end in contact with the reception face, for example a minimum force opposing the relaxation of the spring blade beyond a certain level, or a minimum force operating in the case of lifting or turning of the damping system.

In one embodiment, the holding means include a chamber receiving the support and the blade, the chamber preferably being produced from a permeable and/or flexible and/or semirigid material.

It will be understood here that the chamber limits the possible movements of the support and of the blade by constraining them within a defined volume. In order to allow deformation of the blade, the chamber is itself semirigid and/or flexible, i.e. it can compress and extend until it achieves a maximum volume, the maximum volume defining the maximum relaxation of the blade and preventing detachment of the second end.

It will additionally be understood that the chamber optionally has permeability allowing free passage of air for the purpose of avoiding any pressure effect, while blocking any infiltrations of water, snow or other non-gaseous materials liable to burden or encumber the system.

In an advantageous embodiment of in a particular embodiment, the system comprises means for reducing friction between the second end and the reception face.

It will be understood here that the means for reducing friction limit wear on the second end and on the reception face and prevent forces between the two elements, in particular adhesion of the second end on the reception face, causing irregular behaviour.

Preferably, the means for reducing friction include at least one roller disposed between the second end and the reception face.

In other words, the at least one roller serves as an intermediary between the second end and the reception face, the rotation of the at least one roller accompanying the movement of the second end with respect to the reception face in at least one direction.

Obviously, it is possible to design a plurality of implementations of the at least one roller, for example a plurality of bearings assembled on the second end and oriented in the direction of the reception face or conversely assembled on the reception face in accordance with a longitudinal range of movement of the second end. According to another example, a roller is provided assembled with the second end engaging in a groove disposed on the reception face and defining the longitudinal range of the second end.

In another embodiment, the means for reducing friction include an anti-adhesion covering disposed between the second end and the reception face.

The anti-adhesion covering is for example disposed on the second end and/or on the reception face and is produced from an anti-adhesive material, for example from polytetrafluoroethylene, referred to as Teflon®. This design in particular reduces the number of parts used and the volume of the damping system.

In a specific embodiment, the damping system comprises first means for guiding the second end in translation with respect to the reception face.

In other words, the first guidance means limit the movement of the second end in translation along an axis, for example the second axis as described above. Obviously, the first guidance means allow the movement of the second end in other directions in accordance with a clearance specific to the design.

Preferably first guidance means include two lateral guides assembled with the support and disposed on either side of the reception face.

The lateral guides and the support form for example a single-piece element or two separate elements assembled together. The lateral guides are for example disposed solely in accordance with the longitudinal range of the second end and spaced apart by a distance corresponding to the width of the second end so as to precisely guide the movement of the second end, or disposed along the whole of the support across the width of the support so as to provide contact of the second end with the support.

In yet another embodiment, the first guidance means include a second rod assembled with the second end and at least one aperture provided on the support, the at least one aperture receiving the second rod and providing translation thereof along the at least one aperture.

In other words, the at least one aperture defines the longitudinal range of the second end, the translation of the second rod in the at least one aperture corresponding to the translation of the second end and therefore to the compression and/or relaxation of the spring blade. The second rod is for example assembled in the at least one aperture so as to hold the second end in contact with the reception face like the holding means described above.

In one design, a single aperture is provided, provided along the reception face, the second rod being oriented on a third axis perpendicular to the plane of the reception face and moving on the second axis. In another design, two apertures are provided, symmetrical with each other and provided on lateral edges of the support, for example on lateral guides as described above, the second rod being oriented parallel to the first axis and moving on the second axis.

Preferably, the second rod corresponds to a removable pin.

It will be understood here that the removable character of the pin facilitates the assembly and disassembly of the damping system, as well as the association thereof with the article according to their respective designs, while keeping the properties described above with regard to the second rod.

In an additional embodiment, the blade has an internal face facing the reception face and an external face opposite to the internal face, the damping system comprising secondary damping means disposed on the reception face and/or the external face, said secondary damping means being produced from an elastic material.

It will be understood here that the secondary damping means make it possible to avoid and/or to limit shocks without including additional spring elements, in particular to allow silent operation of the damping system. For example, secondary damping means are provided, disposed on the reception face so as to avoid any direct shock in the case of contact of the support, for example with the ground, as well as secondary damping means disposed on the external face reproducing for example a sole and allowing adhesion of the damping system.

In one embodiment, the damping system comprises a second longitudinal elastic reinforcement assembled with the first and second ends.

It will be understood here that the second elastic reinforcement generates a longitudinal return force for example facilitating the relaxation of the spring blade or limiting compression thereof, for example beyond a predefined threshold. The second elastic reinforcement is for example added at one point or sized in an individual manner to adjust the behaviour of the damping system according to a plurality of user weights or types of articles on which the damping system is mounted.

In a specific embodiment, the support has at least partially a U-shaped cross-section forming a groove, the second end moving inside the groove.

It will be understood here that the U-shaped cross-section of the support increases its resistance to deformation under the return force of the spring blade and consequently reduces the volume and the weight of the support for the same resistance to deformation. It will also be understood that the U-shaped cross-section of the support has two lateral edges forming for example the lateral guides described above and affording the translational guidance of the second end. The support has for example the U-shaped cross-section on the reception face and/or on a portion of the support liable to deformation under the return force.

A person skilled in the art also understands that the selection of materials of the support can be adapted to a design having the U-shaped cross-section. The support has for example a solid structure produced from a rigid lightweight material of the aluminium type, the U-shaped cross section making it possible to select lighter materials and/or ones having a structure that is simpler to implement, for equivalent rigidity.

In one embodiment, the first assembly means include a first part having, on a first distal portion, a U-shaped cross-section forming an opposition to the groove, the first part being assembled on the support on a first proximal portion by means of at least one first stud passing through the support and the first part, the first end being disposed between the at least one first stud and the first distal portion.

It is understood here that the concepts of proximal and distal portions will be taken in considering the position of the portions with respect to a longitudinal central position of the spring blade and of the support. In other words, the first part is oriented so that the first proximal portion is disposed closer to the centre of the spring blade and of the support than the first distal portion.

It will also be understood that the first stud is disposed so as to extend transversely to the groove, thus forming a first obstacle to the movement of the first end in the groove and positioned longitudinally according to the first proximal portion, the first distal portion completing and closing the groove and forming a second obstacle to the movement of the first end of the groove.

A person skilled in the art will understand that the first end is held in position between the at least one first stud and the first distal portion and cannot easily become detached from the support. This positioning is for example complementary to other first assembly means as described below, or in replacement for them, then making it possible to grant a certain latitude of movement to the first end, while keeping it assembled with the support.

A person skilled in the art furthermore will understand that the cooperation of the U-shaped cross-section of the support and that of the first part makes it possible to greatly stiffen the assembly formed by them with respect to any torsion forces that may happen to deform the support and misalign the movement of the spring blade. Such an improvement of the stiffness is also described with regard to the following embodiments.

In particular, this design greatly frees the rotation of the first end on the first axis, minimising the friction or any other force opposing it and allowing the spring blade to relax and compress while minimising the resulting deformations with respect to the first end.

Preferably, the first assembly means furthermore include a removable pin passing through the support and the first part and disposed between the at least one first stud and the first distal portion, the first end being disposed between the at least one first stud and the pin.

It will be understood here that the pin replaces the first distal portion as second obstacle to the movement of the first end of the groove, making it possible to independently design and size the assembly of the first end with the support, and the positioning between the at least one first stud and the pin, and the stiffening of the support by restricting twisting thereof with the first distal portion.

It will additionally be understood that the removable character of the pin, as presented above, facilitates the assembly and disassembly of the damping system, the first end being able to be positioned before engaging the pin.

In an additional embodiment, the damping system furthermore includes a second part having, on a second distal portion, a U-shaped cross-section forming an opposition to the groove, the second part being assembled on the support on a second proximal portion by means of at least one second stud passing through the support and the second part, the second end being disposed between the at least one second stud and the second distal portion.

It will be understood here that the second part and the second stud can be assembled in a complementary manner to the first part and to the first stud in accordance with a symmetrical design of the damping system, or in combination of various first assembly means or according to a sizing adapted to a different range of movement of the second end according to an asymmetric design of the damping system.

It will also be understood that the concepts of second distal and proximal portion will be taken in consideration of their position with respect to a longitudinal central position of the spring blade and of the support, and that the advantages relating to the stiffening of the support and to the sliding of the second end in the groove are similar to those described with regard to the first part and the first end.

In another embodiment, the first assembly means include:
a hinge assembled with the first end and the support; or
a block produced from an elastic material assembled with the first end and the support; or
a half-hinge assembled with the first end and a pivot connection arranged between the half-hinge and the support; or
a screw-nut assembly assembled with the first end and the support; or
a first rod assembled with said first end and at least one aperture provided on said support; or
a removable pin assembled with said first end and at least one aperture provided on said support.

It is understood here that the first assembly means can be implemented according to a variety of forms, and are selected by a person skilled in the art according to a plurality of criteria including lightness, resistance to wear and to deformation, the clearance permitted for the rotation of the first end with respect to the support in comparison with the angular range of deformation of the spring blade, any range of movement granted to the first end, case of assembly and/or disassembly of the damping system, or economic criteria. A variety of other first assembly means can also be envisaged, for example simple adhesive means.

In an additional embodiment, the support comprises a chassis and a sliding part, the chassis having a U-shaped cross-section and the sliding part having at least partially a rectangular cross-section, the chassis and the sliding part being configured to fit together so as to form a guide in translation on an axis parallel to the axis of movement of the second end, the first means of assembling the first end with the support being configured to assemble the first end with the chassis, the damping system furthermore including second means of assembling the second end with the sliding part, the U-shaped and rectangular cross sections extending from a face opposite to the reception face.

In other words, the second end is assembled and held in contact with the sliding part having the reception face, the sliding part itself being guided in translation with respect to the chassis to enable the movement of the second end in the plane during decompression and/or relaxation of the spring blade. The movement of the second end in the plane is thus accompanied by the guidance of the sliding part with the chassis. The translational guidance between the chassis and the sliding part is for example configured to allow the translation of the second end, which is assembled with the sliding part, on the second axis as defined above.

A person skilled in the art will also understand that the guidance of the sliding part and of the chassis makes it possible, through their U-shaped and rectangular cross sections, to laterally stiffen the movement of the spring blade by opposing the twisting and rotation of the spring blade outside its compression and/or relaxation movements. The U-shaped and rectangular cross sections extending on a face opposite to the reception face, these not opposing the compression of the spring blade, which thus has the same extreme positions, going for example as far as pressing the spring blade against the support.

Furthermore, the chassis having a U-shaped cross-section, the means for receiving an article can be disposed inside the U-shaped cross-section, thus make it possible to preserve the compactness of the damping system despite the extension of the U-shaped and rectangular cross sections opposite to the reception face.

It will additionally be understood that, just as the first assembly means allow movement of the first end with respect to the chassis on a pivot connection, the second assembly means allow a movement of the second end with respect to the sliding part on a pivot connection, for example on a fourth axis parallel to the first axis defined above.

Preferably, the chassis fits on the sliding part, the support furthermore comprising a guide part having a cross-section in a square or in a U, the guide part being assembled with the chassis and creating an adaptation of the sliding part in the chassis.

It will be understood here that the guide part is disposed so as to partially obstruct the opening formed by the U-shape of the cross section of the chassis, the cross section in a square or in a U completing and closing the opening.

This design thus makes it possible, when the U-shaped chassis fits on the rectangular sliding part, to prevent or limit any rotation of the chassis with respect to the sliding part and to maintain its movement in accordance with the translational guidance stated above. According to the design, a guide part and a chassis produced as a single-piece element receiving the sliding part, or as two distinct elements assembled for example after the positioning of the sliding part in the chassis, are provided In a supplementary embodiment, the sliding part includes a first portion having a rectangular cross-section and fitting together with the chassis, the sliding part furthermore including a second portion having a U-shaped cross-section.

It will be understood here that this design allows the production of a support, i.e. an assembly consisting of chassis and sliding part, having a U-shaped cross-section at its two longitudinal ends, in particular so as to allow reception of an article or of elements of an article at these two ends and guaranteeing better stability of the article when the latter is equipped with the damping system. For example, means are provided for receiving means for the anterior and posterior movement of the article disposed respectively at the second portion and the chassis, such means extending vertically beyond the U-shaped and rectangular sections of the support and thus preserving the compactness of the article equipped with the damping system.

Preferably, the first portion and the second portion form two distinct elements assembled together.

A person skilled in the art will understand here that this design allows ease of production of the first and second portions as well as adapting the second portion on the first portion so that the second portion extends in the same plane as the chassis and has the reception face.

In yet another embodiment, the damping system comprises second means for guiding the sliding part in translation with respect to the chassis.

It will be understood here that the second guidance means facilitate the translation of the sliding part and of the chassis and therefore by extension the movement of the second end on the second axis, or to limit the movement of the sliding part and of the chassis assembled with a clearance.

Preferably, the second guidance means include a guide assembled with the sliding part, the chassis having at least one aperture oriented on an axis parallel to the movement axis of the second end, the at least one aperture receiving the guide and providing translation thereof along the at least one aperture.

In other words, in a similar manner to the first guidance means, the at least one aperture defines the longitudinal range of the sliding part, the translation of the guide in the at least one aperture corresponding to the translation of the sliding part and therefore by extension to the translation of the second end, i.e. to the compression and/or relaxation of the spring blade.

In one embodiment, the second assembly means include the second guidance means.

It will be understood here that the second assembly means and the second guidance means have a conjoint design for providing together the assembly of the second end with the sliding part and the translational guidance of the second end and of the sliding part, made integral on at least the second axis, with respect to the chassis.

In a conjoint design of the previous embodiments, the guide thus corresponds for example to a removable assembly screw for securing the sliding part to the second end or to another element included in the second assembly means and secured to the second end, for example a hinge as described below. According to another example, the guide corresponds to a stud extending from the second end or from an element secured to the second end and engaging in the at least one aperture.

In another embodiment, the second assembly means include:
- a hinge assembled with the second end and the sliding part; or
- a block produced from an elastic material assembled with the second end and the sliding part; or
- a half-hinge assembled with the second end and a pivot connection arranged between the half-hinge and the sliding part; or
- a screw-nut assembly assembled with second first end and the sliding part.

It is understood here that, like the first assembly means, the second assembly means can be implemented according to a variety of forms, and are selected by a person skilled in the art according to a plurality of criteria including lightness, resistance to wear and to deformation according to the forces to which they are subjected, the clearance of the second end with respect to the sliding part and the risks of transmission of twisting to the spring blade, or economic criteria.

According to a variant embodiment, the sliding part is fitted together with the chassis in a longitudinal extension of the second end.

According to a variant embodiment, the sliding part is fitted together with the chassis in a portion of the chassis longitudinally coincident with the second end.

It will be understood here that the positioning of the sliding part is selected conjointly with the assembly of the sliding part with the second end and in consideration of the assembly of the damping system with the article. The positioning of the sliding part in the longitudinal extension of the second end thus makes it possible to maximise the length of the chassis not having any interference with the sliding part and thus enabling it to be assembled with the article in a more stable manner. In other words, this positioning maximises the space available under the chassis to fix the article therein, for example to suspend it. Conversely, the positioning of the sliding part in a portion of the chassis longitudinally coincident with the second end minimises the total length of the damping system to offer a more compact solution, when attachment of the article so permits.

A second aspect of the present invention relates to an article including at least one sole receiving a damping system according to the first aspect of the invention.

Sole, within the meaning of the present document, means here and throughout the description an article receiving the weight of the article and/or of the user during movement and/or use thereof.

In other words, the sole serves as an intermediary between the article and the ground and/or another product, the damping system reducing shocks and accompanying the movements at the sole. The damping system is for example disposed adjacent to the sole or to the inside thereof, the sole forming a chamber as described above.

Preferably, the article is of the footwear article type, for which the means for assembling the damping system are disposed at the heel of the footwear article, the blade extending towards the front of the footwear article.

In other words, the damping system is received by the sole of the footwear article, for example removably under the sole of the footwear article, the support having means for attaching the footwear article, or in a compact design inside the sole.

It will be understood additionally that the orientation of the damping system makes it possible to accompany the movement of the ankle of the user during walking, which greatly increases the comfort of the user in comparison with previous solutions, while make it possible to generate propulsion when the blade relaxes, i.e. when the foot of the user is lifted, which thus reduces the forces necessary for practising walking, running or jumping.

In a specific design, footwear articles are provided comprising a plurality of damping systems, for example specialist footwear articles of the tap-dancing shoe type, which comprise two distinct damping systems disposed on their front and rear ends, for the purpose of accompanying the movements specific to the user thereof.

According to yet another design, a footwear article is provided equipped with movement means, for example secured to or separated between anterior and posterior movement means, the damping system being disposed between the sole of the footwear article and the movement means.

Obviously, a plurality of articles able to receive a damping system according to the first aspect of the invention are provided in the same way. The article belongs for example to a set of articles including:
- an artificial limb of the prosthesis or robot type, for example associated with a footwear article; and
- a seat of the furniture seat, wheelchair, bicycle or motorbike saddle, vehicle seat or equestrian saddle type; and
- an individual suspension of the bicycle pedal type, or gyropode, skateboard, snowboard or scooter suspension type; and
- a land vehicle suspension of the automobile, trailer or truck type; and
- an aquatic vehicle suspension for damping the variations in height of the water, or fulfilling the role of suspended "foil", for example an aquatic vehicle of the catamaran, motor or sail boat, hydrofoil or jet ski type; and
- a wing suspension of an aircraft for damping variations of the air; and
- a bedding suspension, or baby cot or basket.

The exact sizing of the damping system, as well as the selection of materials or of curvature of the spring blade, is then adapted to the article receiving same.

In one embodiment, the sole of the article and the support form a single-piece element. It will be understood here that the sole of the article at least partially forms the support of the damping system received by the article, in particular in the context of a conjoint design of the article and of the damping system or of an assembly of the elements of the damping system directly on the sole of the article. Such a design thus simplifies the overall structure of the article receiving the damping system, by reusing the structure of the article to form a fixed part of the damping system, a movable part consisting for example of the spring blade and optionally other elements of the support moving directly with respect to the sole.

Obviously, when the support is itself produced from a plurality of distinct elements, it is meant here that the sole of the article forms a single-piece element with one of the elements of the support.

In another embodiment, the article has a set of movement means, the set of movement means including first movement means and second movement means assembled together by means of the damping system, the damping system extending longitudinally between the first and second movement means.

It will be understood here that the movement means correspond to floats, wheels, runners or any other element appropriate to the nature of the article. The first movement means are for example assembled according to a longitudinal portion of the damping system corresponding to the first end of the spring blade of the damping system, the two movement means being assembled according to a longitudinal portion of the damping system corresponding to the second end of the spring blade of the damping system.

Preferably, the article has a body assembled with a central portion of the damping system.

It is understood here that the body of the article and the set of movement means are respectively assembled with the damping system in an opposite manner on a substantially vertical axis, the article resting centrally on the damping system and the movement means being disposed on either side thereof, so as to guarantee stability thereof. The damping system is, in other words, disposed between the body of the article and its movement means.

Preferably, the body is assembled with the central portion so as to allow rotation of the damping system with respect to the body on a substantially vertical axis.

It is understood here that the rotation makes it possible to adjust the orientation of the damping system and by extension of the movement means with respect to the body. Such a rotation is for example controlled by a steering implemented according to means known to a person skilled in the art.

In a particular embodiment, the article includes a plurality of sets of movement means and receives a plurality of damping systems, each damping system being respectively associated with a set of movement means and allowing the assembly of the first movement means and of the second movement means of the set of movement means.

It is understood here that such a design increases the stability of bulky articles, or allows more complex movements in combination with the previous embodiment. For example, an article is provided including two sets of movement means to a total number of four, connected in pairs via two distinct damping systems each forming a train of the article, one of the damping systems being for example assembled with the body of the article so as to allow rotation thereof and thus providing movements of the article.

In an additional embodiment, the article receives the damping system by means of at least one hinge and/or at least one double hinge, in particular a spring-action double hinge with adjustable tension.

It is thus understood that such an assembly makes it possible to create a rotation of the body and/or of the movement means with respect to the damping system on an axis, thus attenuating the pitch or roll movements of the article during use thereof, in particular improving the stability of an article of the aquatic vehicle type subjected to waves or of the sledge type subjected to variations in height related to the terrain and/or to snow.

Thus, through the various aforementioned functional and structural features, the Applicant proposes a simplified compact damping system that can in particular be incorporated in a footwear article so as to accompany the walking movements without restricting the mobility of the user.

BRIEF DESCRIPTION OF THE FIGURES

Other features and advantages of the present invention will emerge from the following description with reference to the appended FIGS. 1 to 24 illustrating a plurality of example embodiments that do not have any limitative character and on which.

DETAILED DESCRIPTION

Figure 1:
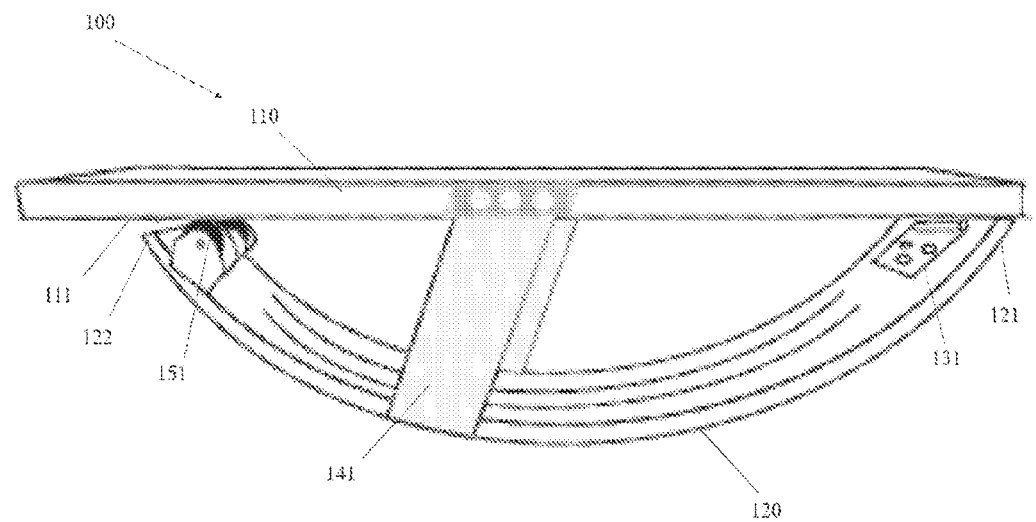
FIG. 1 shows a schematic profile view of a damping system according to a first example embodiment of the present invention.

The present invention will now be described hereinafter with reference conjointly to FIGS. 1 to 24 appended to the description. The same elements are identified with the same reference signs throughout the following description.

As indicated in the preamble of the description, the current solutions of damping systems cannot be incorporated in footwear articles without interfering with the walking movements.

One of the objectives of the present invention consists in making it possible to incorporate a damping system in a footwear article in an ergonomic manner adapted to walking, running and jumping movements.

This is made possible in the example described below, which considers a footwear article of the shoe type receiving a damping system.

It will be understood here that this example is not limitative and that the invention will find other applications for incorporating damping systems in a variety of articles, for example with saddlery articles or vehicle suspensions.

According to the example in FIGS. 9 to 11 and 14, a damping system 100 developed in the context of the present document is associated with an article 200, here an article 200 of the footwear article type. According to other examples, a damping system 100 is provided associated with another article 200, in particular with regard to FIGS. 22 and 23 corresponding for example to associating a damping system with an aquatic vehicle and with regard to FIG. 24 corresponding for example to associating a damping system with an article of the sledge type. In order to receive the weight of the user of the article 200, the damping system 100 is associated in particular with a sole 210 of the article 200, the sole 210 initially receiving the weight of the user. The damping system 100 can be designed specifically to be associated with the sole 210, for example designed to be incorporated inside a sole 210 at least partially hollowed out (FIG. 10), be a model designed for associating it with a variety of footwear articles, or more generally be a basic model adaptable to a plurality of articles 200. Obviously, a damping system 100 is also provided, specifically designed for associating it with an article 200 or a particular type of article, for example a damping system 100 sized to the scale of the article 200 or to the scale of a standard model of a type of article, example to the scale of a saddlery article. According to the example in FIG. 11, the damping system 100 is for example sized to be positioned removably inside a closed article 200, for example a footwear article of the flexible ankle boot type having a deformable sole 210, the damping system 100 being superimposed on the sole 210 of the article 200 and being for example itself covered by an interior sole 230.

Figure 14:
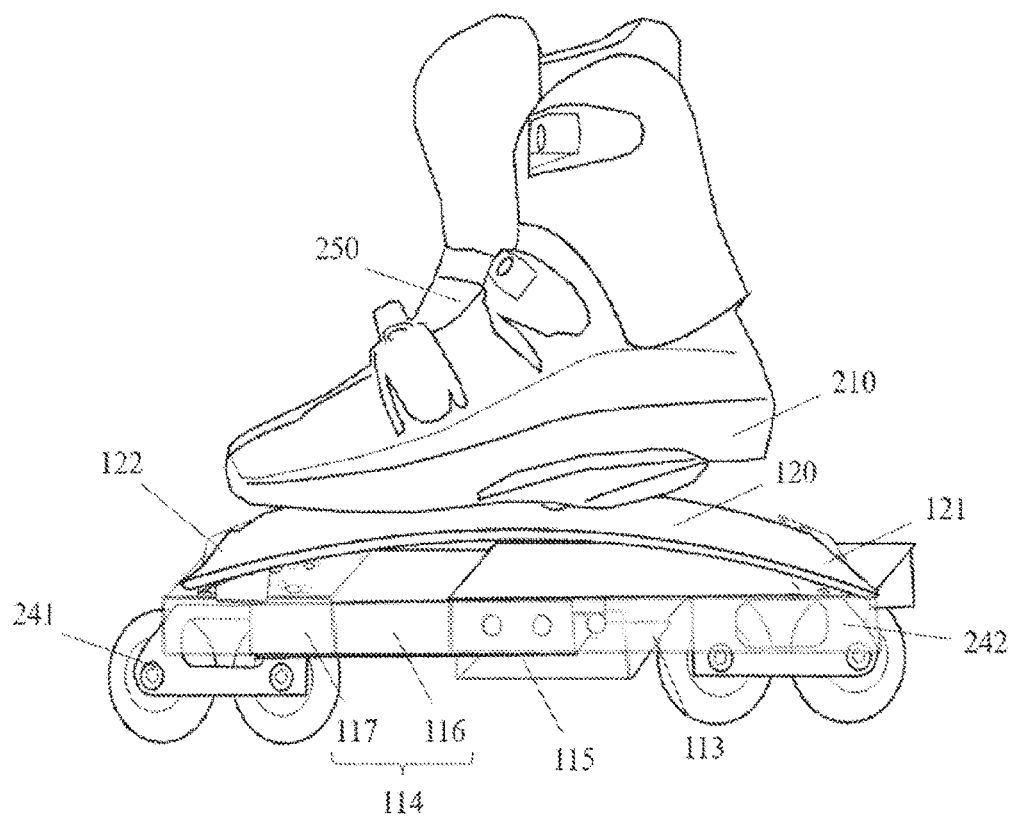
FIG. 14 shows a schematic profile view of a footwear article receiving a damping system according to FIG. 12.

According to another example illustrated in FIG. 14, the damping system 100 is sized to be incorporated in an article 200 equipped with a set of movement means 241, 242, for example one or more wheel trains accompanying the translation of a footwear article by their rotation, or one or more runners, for example several ice skates, enabling the footwear article to slide over the ice. The set of movement means 241, 242 thus includes first movement means 241 and second movement means 242, the damping system extending longitudinally between the first movement means 241 and the second movement means 242 and enabling them to be assembled with each other and with the body 250 of the article 200.

Figure 22:
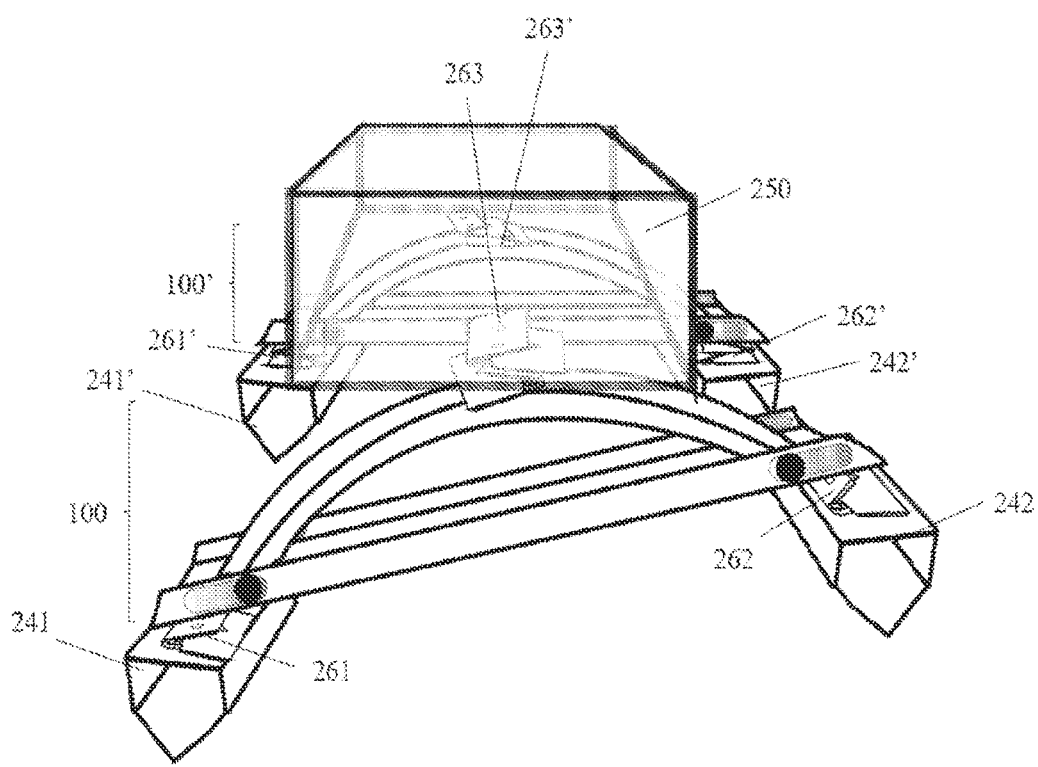
FIG. 22 shows a first article including a plurality of sets of movement means and receiving a plurality of damping systems according to FIG. 20.

According to yet another example illustrated in FIG. 22, a plurality of damping systems 100, 100' are provided, sized to be incorporated in an article 200 equipped with a plurality of sets of movement means 241, 242, 241', 242', for example one or more floats or skis enabling the article 200 to move in an aquatic or snowy environment and adapting to a variable level of water or of the snow slope. Each pair 241, 242 and 241', 242' of movement means then forms a train of the article 200. One of the damping systems 100, 100' is for example assembled with the body 250 so as to allow a rotation between it and the body 250 on a substantially vertical axis, thus forming a steering of the article 200.

In this same example, the article 200 receives the plurality of damping systems 100, 100 by means of double hinges 261, 262, 263, 261', 262', 263', in particular spring-action double hinges with adjustable tension, allowing an independent rotation of the body 250, of the damping systems 100, 100' and of the movement means 241, 242, 241', 242' on a given horizontal axis and thus damping the pitch and roll movements of the article 200. In the example in FIG. 24, an article 250 is provided receiving damping systems 100, 100' by means of similar double hinges 263, 263' independently of the presence or not of movement means associated with the article 200, the damping systems 100, 100' resting for example directly on the ground.

Figure 23:
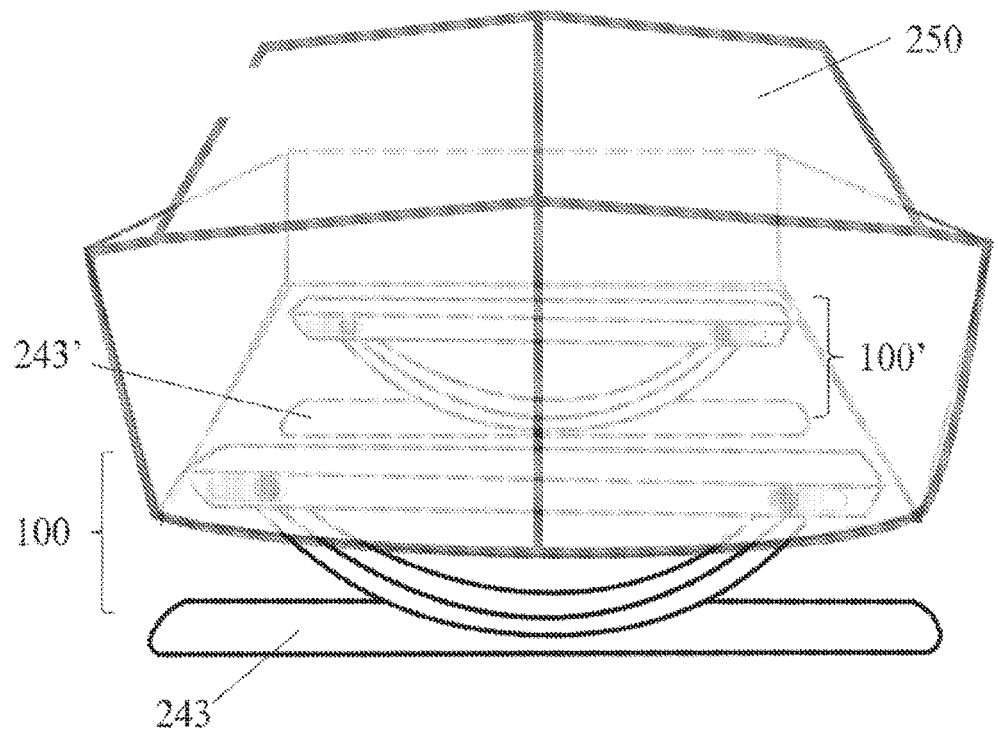
FIG. 23 shows a second article including a plurality of damping systems according to FIG. 20.
Figure 24:
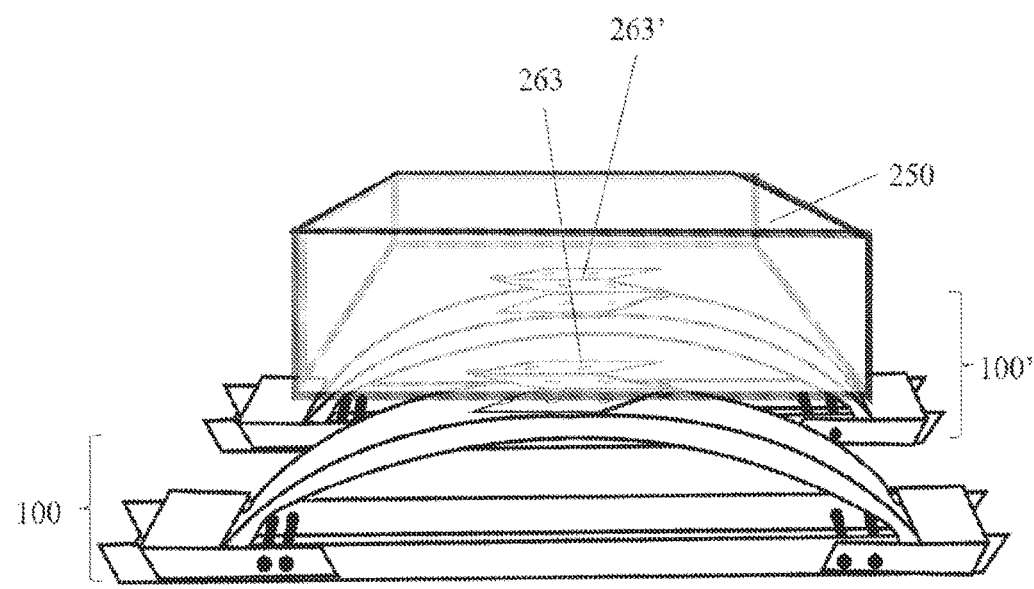
FIG. 24 shows an article including a plurality of damping systems according to FIG. 19.

According to a variant illustrated in FIG. 23, the article 200 is equipped with a plurality of single-piece movement means 243, 243', each single-piece movement means 243, 243' being individually connected to the body 250 of the article 200 by an individual damping system 100, 100'. The single-piece movement means correspond, in a particular example, to "foils", also referred to as lift wings, of an article 200 of the hydrofoil type, the damping systems 100, 100' making it possible to adjust their movement to the waves of an aquatic environment. According to yet another variant, the article 200 of the hydrofoil type is equipped with a plurality of damping systems 100, 100' serving directly as foils, i.e. in direct contact with the aquatic medium without the intervention of movement means.

Figure 2:
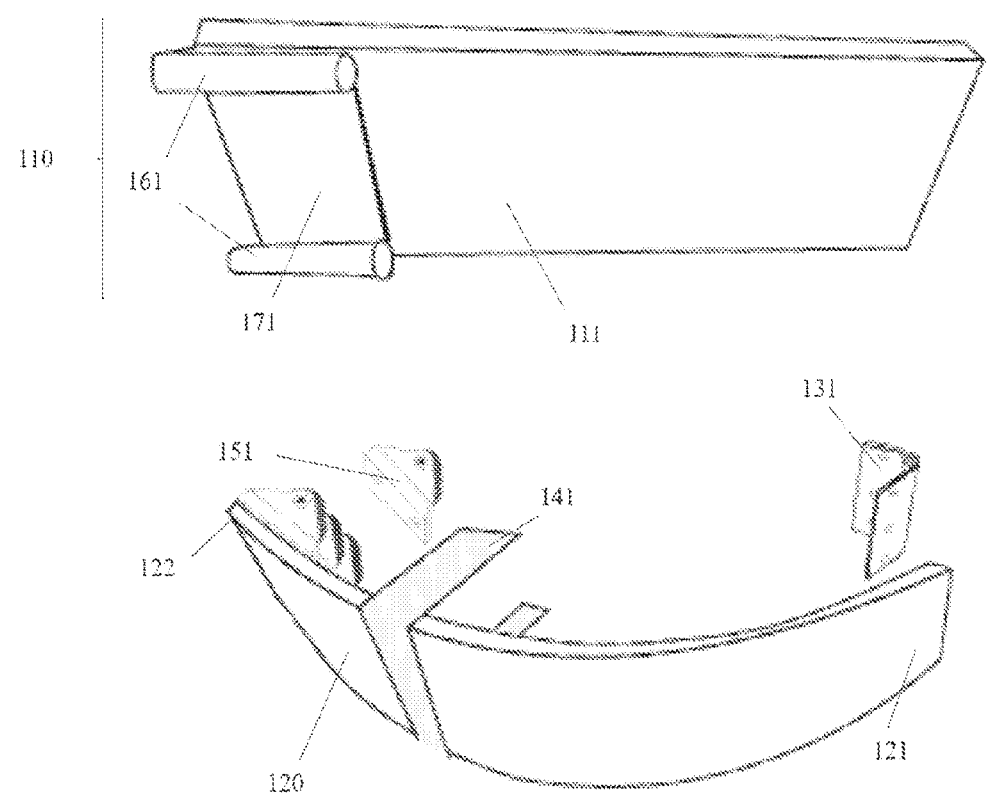
FIG. 2 shows an exploded view of a damping system according to a second example embodiment of the present invention.

According to the example in FIGS. 1 and 2, the damping system 100 includes a spring blade 120 including a first end 121 and a second end 122. Advantageously, the blade 120 has a curved shape between the ends 121, 122 and is able to deform elastically through movement of the ends 121, 122 closer to or further away from each other, i.e. by changing the curvature of the curved shape of the blade 120.

In this same example, the blade 120 is assembled at its first end 121 with a rigid support 110 by means of first assembly means, for example via a hinge 131 assembled with the first end 121 and the support 110 and allowing a rotation movement between the first end 121 and the support 110 on a first axis defined by the hinge 131.

In agreement with the underlying concept of the invention, the blade 120 and the support 110 are assembled by means of the hinge 131 and the first end 121 so that the curved blade 120 extends along the support 110 on a convex (or curved) path, the second end 122 being put in contact with a reception face 111 of the support 110, the reception face 111 extending along a plane. The support 110 is for example itself planar, or has a planar reception face 111 opposite to a face comprising means 112 for attaching an article 200, for example the attachment means 112 of FIG. 8.

Figure 9:
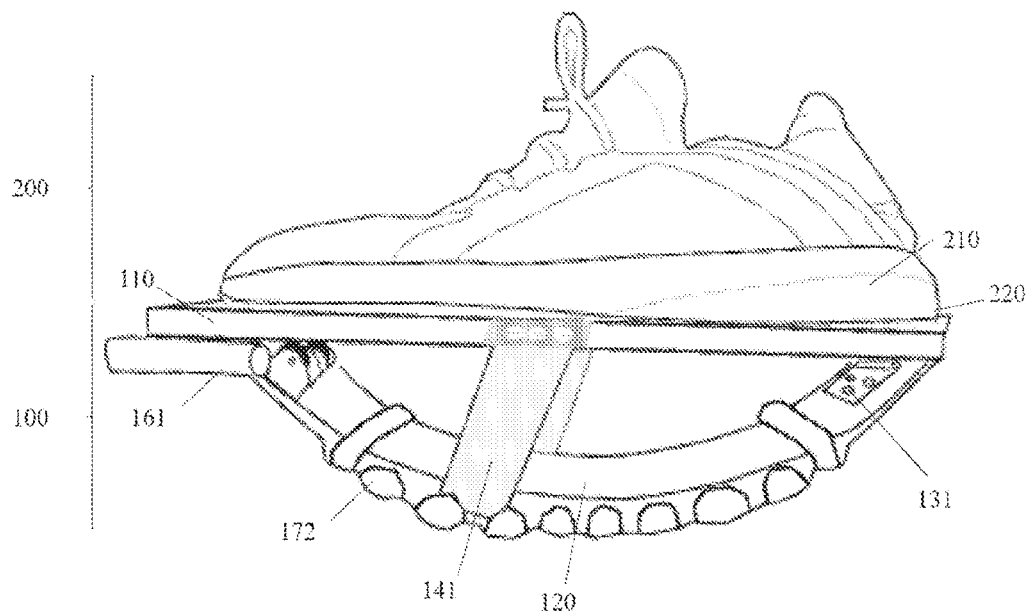
FIG. 9 shows a schematic profile view of a footwear article receiving a damping system according to an eighth example embodiment of the present invention.
Figure 10:
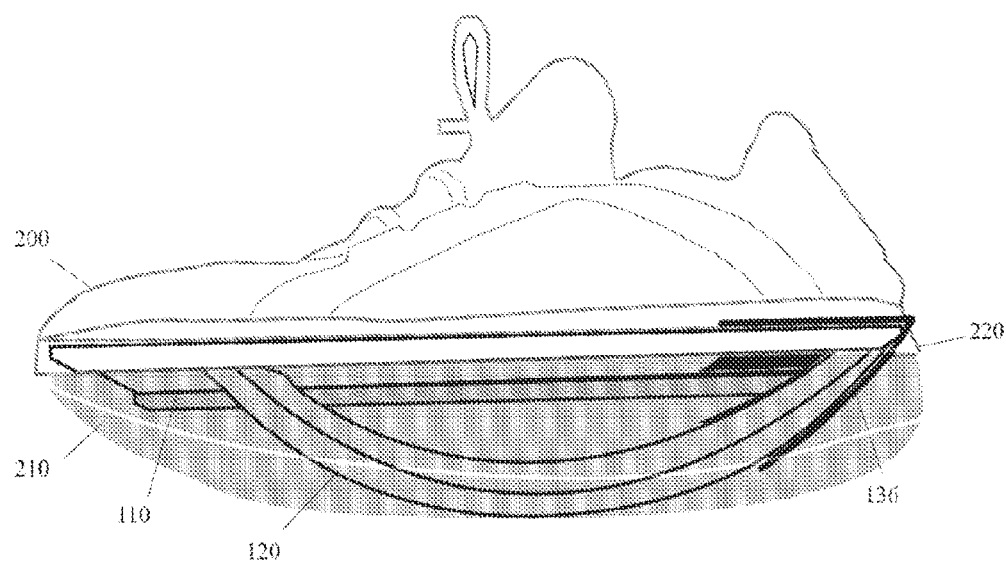
FIG. 10 shows a schematic profile view of a footwear article receiving a damping system according to a ninth example embodiment of the present invention.
Figure 11:
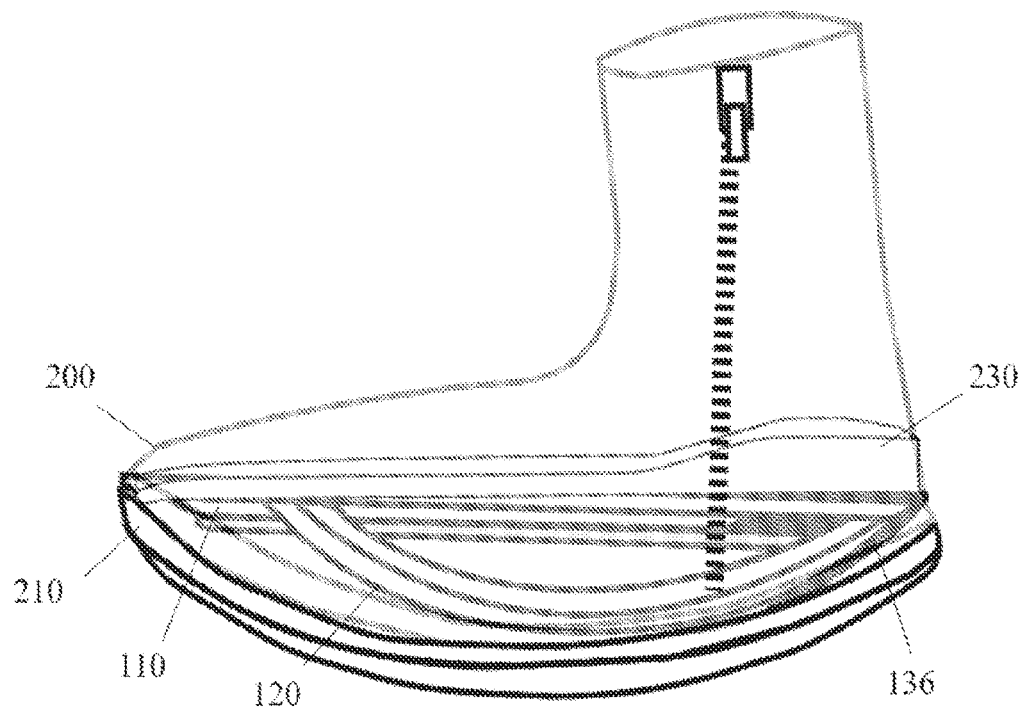
FIG. 11 shows a schematic profile view of a footwear article receiving a damping system according to a tenth example embodiment of the present invention.

When the blade 120 is compressed and/or relaxes, for example when the user of the article 200 of FIGS. 9, 10 and 11 presses on the article 200, the article 200 transmitting the weight of the user to the damping system 100, the first end 121 is consequently rotated with respect to the support 110 on the first axis defined by the hinge 131, while the second end 122 put in contact with the reception face 111 moves along the reception face 111, example on a second axis perpendicular to the first axis and included in the plane of the reception face 111. The return force of the blade 120 at the same time accompanies the relaxation movement of the blade and is transmitted to the article 200 and therefore to the user, which thus causes a bounce.

In a specific design appropriate to the association of the system 100 with an article 200 of the footwear article type for the walking of the user and illustrated in FIGS. 9, 10 and 11, the first assembly means are disposed at the heel 220 of the footwear article, the blade 120 extending towards the front of the footwear article, so that the movements of placing the foot of the user, beginning with their heel, is accompanied rotationally by the rotation of the first end 121, the second end 122 sliding towards the tip of the footwear article before it is placed. When the foot of the user is lifted, the return forces of the blade 120 are as a priority transmitted in the body of the support 110 and the heel 220 via the first end 121, the second end 122 being free. The bounce is thus mainly generated towards the rear of the foot of the user, accompanying their forward movement.

So as to further assist the walking of the user and to approach a normal use of a footwear article, secondary damping means are provided comprising a reproduction of a sole 172 disposed on the face of the system 100 in contact with the ground and adhering to the ground. According to the example in FIGS. 8 and 9, the reproduction of a sole 172 is thus disposed on the external face of the blade 120.

Obviously, it is possible to adapt the arrangement of the system 100 to the expected behaviour of the user of the footwear article or to the expected use of the article 200 associated with the system 100. The system 100 can thus be associated with the sole 210 of the article 200 by the support 110 or by the blade 120 and the first assembly means oriented at an end of the article 200 so as to accompany the expected movement or movements. For example, a footwear article is provided comprising two damping systems 100, a first system being disposed at the heel thereof and a second system being disposed at the toe thereof, so as to facilitate the placing of the foot at the heel and the toe. In particular according to the example in FIG. 10, an article 200 is also provided, including a sole 210 at least partially hollowed out and having a top wall and a bottom wall, the system 100 being incorporated between the two walls of the sole 210 and disposed so that the support 110 is, according to the design, attached to and/or put in contact with the top wall or the bottom wall, the blade 120 being attached to and/or put in contact at this intermediate portion with the wall opposite to the one associated with the support 110. In other words, the article 200 has a double sole including a top sole forming the top wall and a bottom sole forming the bottom wall, the system 100 being disposed between the top sole and the bottom sole.

Figure 20:
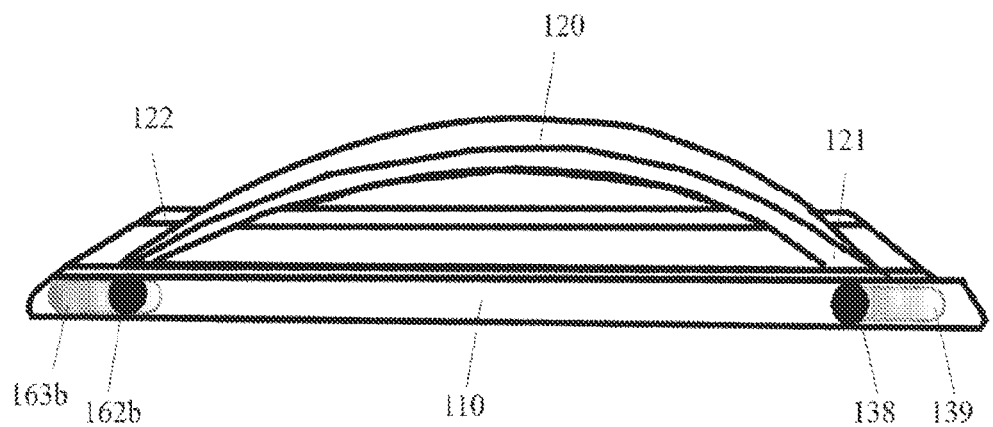
FIG. 20 shows a schematic profile view of a damping system according to a sixteenth example embodiment of the present invention.
Figure 21:
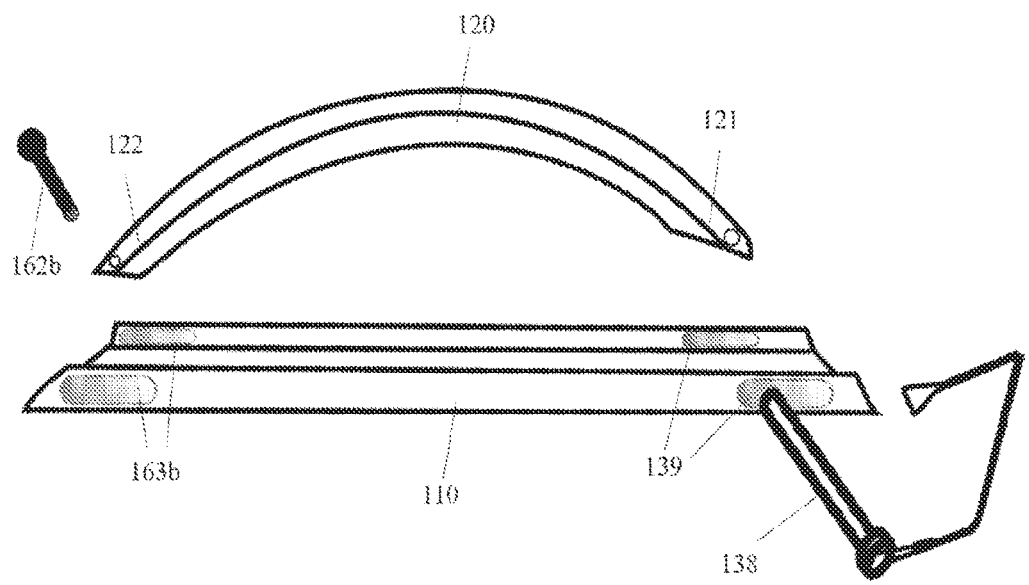
FIG. 21 shows an exploded view of a damping system according to FIG. 20.

As a complement to the arrangement of the first assembly means, according to the simplicity of manufacture, the compactness of the system 100, the expected wear on the first assembly means, the freedom of rotation of the first end 121 with respect to the support 110 or the expected amplitude of the deformation of the blade 120, a variety of means are provided for implementing the first means of assembly between the support 110 and the first end 121, illustrated in FIGS. 4 to 7, 10, 11, 20 and 21, in particular a block 132 produced from an elastic material able to deform freely (FIGS. 4 and 5), a half-hinge 133 associated with a first rod 134 forming a pivot connection (FIG. 6), a screw-nut assembly 135 (FIG. 7), simple adhesive means 136 (FIGS. 10 and 11), or a set formed by a first rod or a removable pin 138, assembled firstly with the first end 121 and secondly with at least one aperture 139 provided on the support 110 and allowing translation of the first rod or pin 138 (FIGS. 20, 21). According to the design, a first rod or pin 138 is provided, able to be inserted in an opening of the first end 121 (FIG. 21), or a first rod forming a single-piece element with the first end 121 and corresponding to a stud extending therefrom. The invention also covers any other variant of first assembly means known to a person skilled in the art and allowing an association of the blade 120 and of the support 110 providing the movements as described above.

In parallel with the elasticity of the blade 120, the support 110 is rigid, i.e. resistant to deformation in particular on the axis of application of the forces of the blade 120 so as to allow the relative movement of the blade 120 and of the support 110. The support 110 is for example produced from materials selected for their stiffness or has a specific structure increasing its resistance on the axis of application of the forces of the blade 120, for example an alveolar core. According to the example in FIG. 2, a running plate 171 is provided, disposed between the second end 122 and the support 110 to improve the resistance of the support 110 to deformation and to wear.

According to a particular example illustrated in FIGS. 6, 7, 10, 11 and 19 to 21, the support 110 has a U-shaped cross-section thus greatly increasing its resistance to deformation while reducing its weight and thickness, so as to allow a more economical implementation of the damping system 100.

The U-shaped cross-section advantageously forms a groove having the reception face 111, the second end 122 moving inside the groove. The movement of the second end 122 is thus guided along the reception face 111 more or less strictly according to the relative lengths of the groove and of the second end 122. The U-shaped cross-section thus allows the translational guidance of the second end 122 with respect to the reception face 111.

Figure 19:
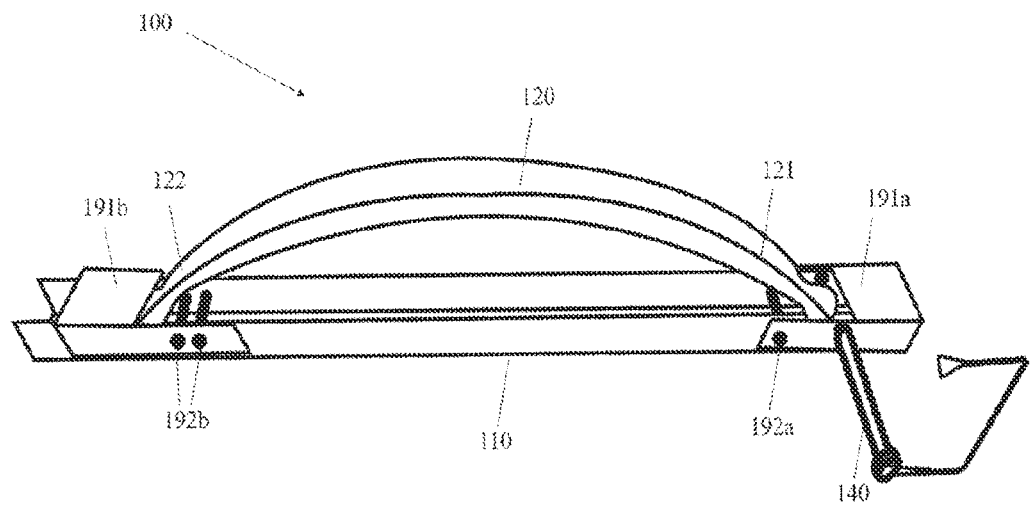
FIG. 19 shows a schematic profile view of a damping system according to a fifteenth example embodiment of the present invention.

According to the particular example in FIG. 19, a first part 191*a* is provided, having a U-shaped cross-section at a first distal portion, the first part 191*a* being assembled with the support 110 via a first stud 192*a*, so that the U-shaped cross-section opposes the groove, i.e. it closes the groove over the length occupied by the distal portion. This design then stiffens the support 110 all the more while preserving the lightness thereof, by opposing the separation of the lateral faces of the support 110 when the latter is subjected to twisting forces.

The first stud advantageously passes through the support 110 and the first part 191a at a proximal portion of the first part 191a, for which the assembly of the first part 191a and of the support 110 is consequently open for insertion of the first end 121. The first end 121 is then disposed between the first stud 192a and the first distal portion, enabling the first part 191a and the first stud 192a to at least partially form the first assembly means. The position of the first end 121 is optionally locked even more by the insertion of a removable pin 140 disposed between the first end 121 and the first distal portion, facilitating the dismantling of the damping system 100 by removing the pin 140 and the first end 121, while leaving a clearance and allowing rotation of the first end 121 on the first axis.

In this same example, a second part 191b is provided, having a U-shaped cross-section at a second distal portion and assembled with the support 110 at a second proximal portion via at least one second stud 192b, for example a plurality of studs forming an additional safety device and preventing any rotation of the second part 191b with respect to the support 110. The second end 122 is then, in a similar manner to the first end 121, introduced between the second stud 192b and the second distal portion, for example with an additional longitudinal clearance facilitating the movement of the second end 122 on the reception face 111 of the support 110.

It is clear that the example of FIG. 19 has a substantially symmetrical design. Obviously, it remains within the capability of a person skilled in the art to provide an asymmetric design making use of the groove formed by the support 110 using different means according to the respective dynamics sought between the first end 121 and the second end 122.

According to a variant design, other translational guidance means are provided, alternative or complementary to the U-shaped cross-section, referred to as first guidance means. According to the example in FIGS. 2, 8 and 9, two lateral guides 161 are provided assembled with the support 110 and disposed on either side of the reception face 111. The lateral guides 161 are for example disposed solely on a portion of the support 110 corresponding to the longitudinal range of movement of the second end 122, for example assembled with a running plate 171 disposed at the same longitudinal range. Advantageously, the lateral guides 161 are extended beyond the support 110 towards the front and are produced from an elastic material of the rubber type absorbing the shock of any contact of the support 110 with another rigid part, for example with the ground during a forward inclination of the footwear article 200 of FIG. 9.

According to another example illustrated in FIGS. 4 to 7 and 20 to 22, a second rod 162a, 162b is provided, assembled with the second end 122, and at least one aperture 163a, 163b provided on the support 110. The at least one aperture 163a, 163b then receives the second rod 162a, 162b and provides translation thereof along the at least one aperture 163a, 163b. The movement of the second end 122 is then constrained according to the movement of the second rod 162a, 162b along the at least one aperture 163a, 163b. The second rod 162a, 162b corresponds for example to a removable pin as illustrated in FIG. 21.

Figure 4:
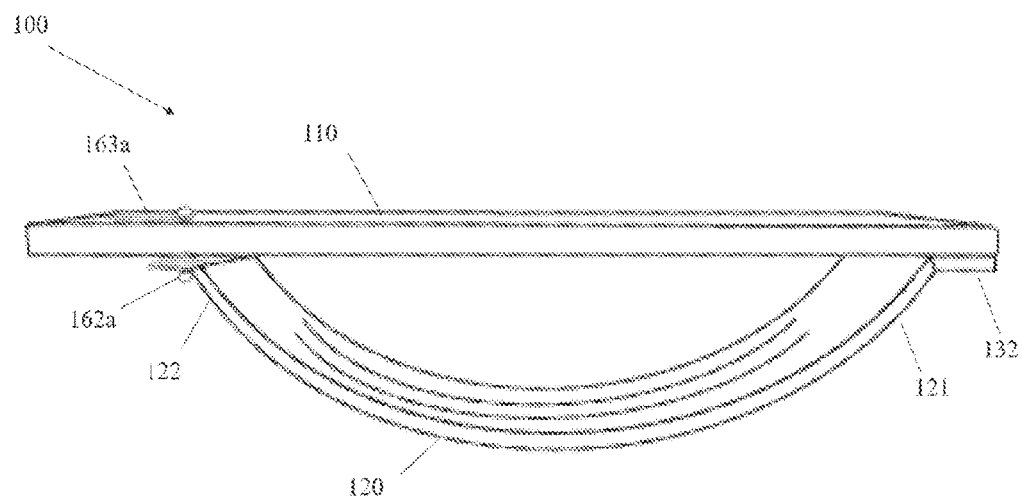
FIG. 4 shows a schematic profile view of a damping system according to a fourth example embodiment of the present invention.
Figure 5:
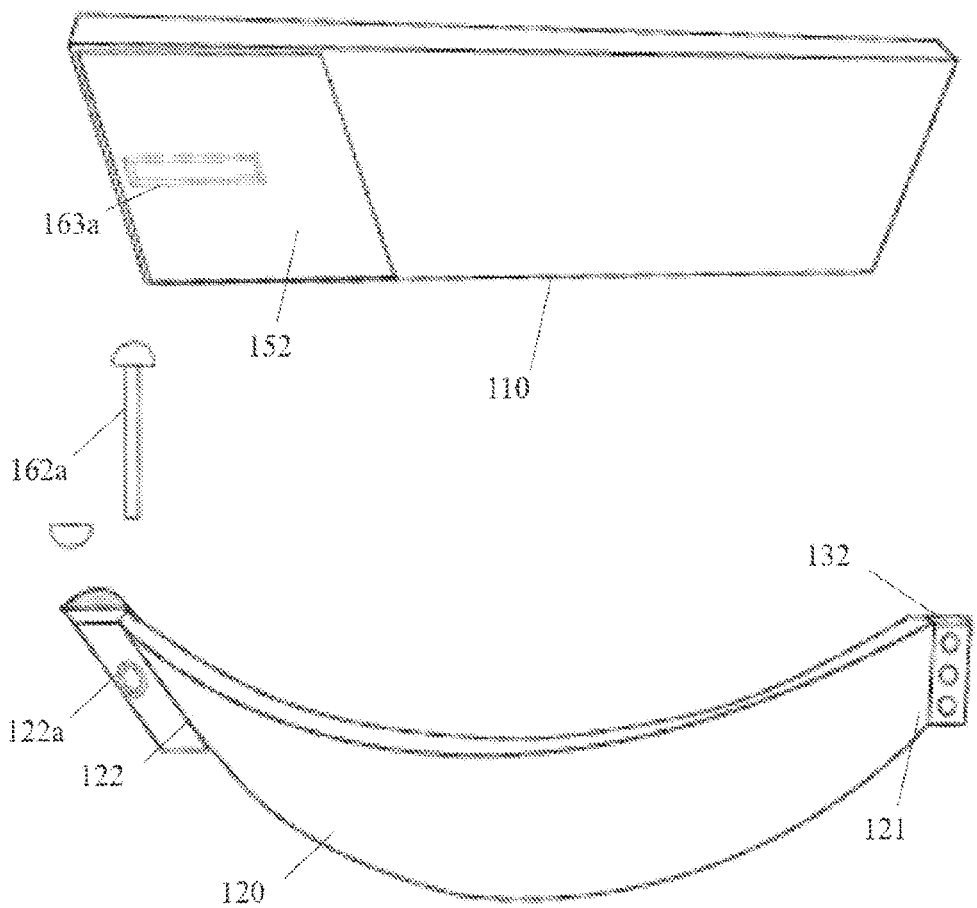
FIG. 5 shows an exploded view of a damping system according to FIG. 4.
Figure 6:
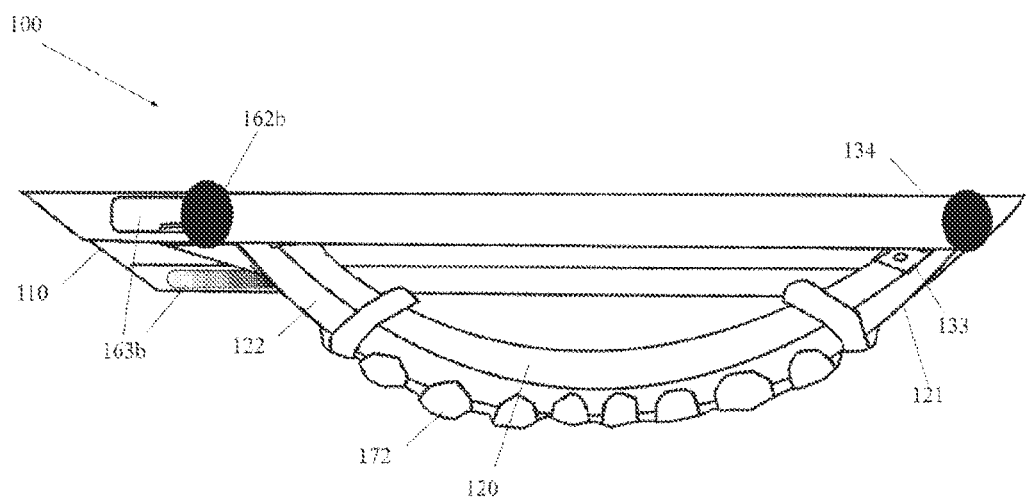
FIG. 6 shows a schematic profile view of a damping system according to a fifth example embodiment of the present invention.
Figure 7:
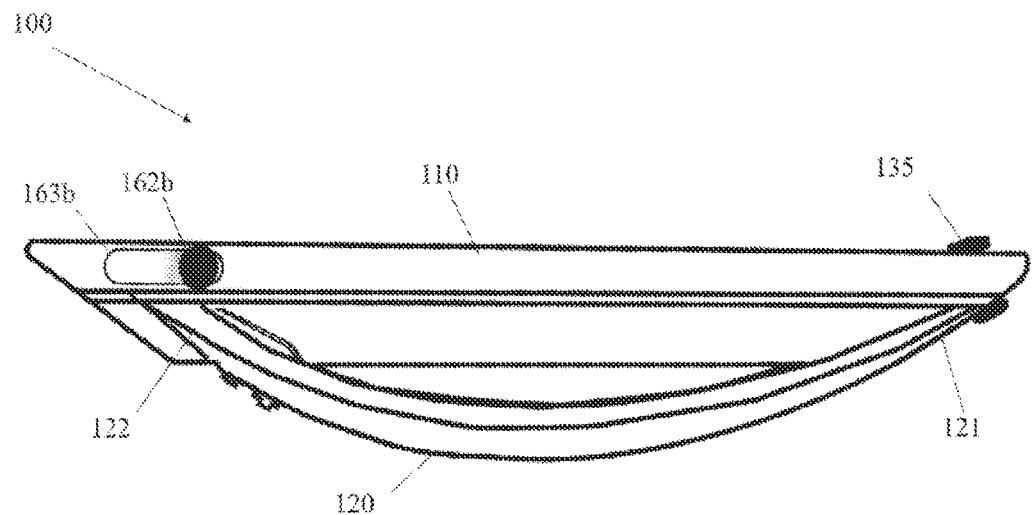
FIG. 7 shows a schematic profile view of a damping system according to a sixth example embodiment of the present invention.
Figure 8:
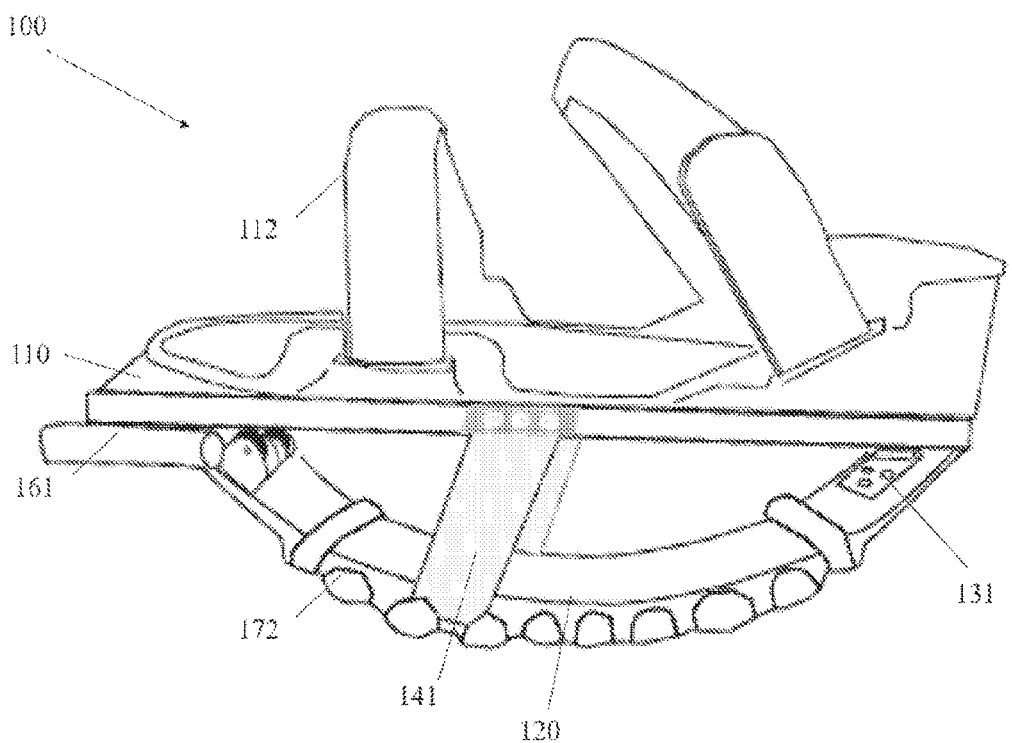
FIG. 8 shows a schematic profile view of a damping system according to a seventh example embodiment of the present invention.

In a specific design illustrated in FIGS. 4 and 5, a single aperture 163 is provided, formed on the reception face 111 and passing through the support 110, the second rod 162a extending on a third axis perpendicular to the plane of the reception face. The second end 122 has for example an orifice 122a complementary to the second rod 162a for assembly thereof.

According to another design illustrated in FIGS. 6, 7, 20 to 23, two apertures 163b are provided, symmetrical with each other and provided on the lateral edges of the support 110, for example the lateral edges of the groove formed by a U-shaped cross-section of the support or the lateral guides 161 assembled with the support 110. The second rod 162b then extends between the two apertures 163b, for example parallel to the first axis, the second end 122 including for example a half-hinge receiving the second rod 162b or directly having an opening enabling the second rod 162b to be inserted (FIG. 21).

Thus, the first guidance means are designed so as to be adapted to the sizing of the support 110 so as to provide the movement of the second end 122 along the reception face 111. It is also observed, in particular in FIGS. 4 to 7, that some solutions employed also make it possible to hold the second end 122 in contact with the reception face 111 while allowing only a longitudinal movement between the two elements.

According to a variant, holding means are provided independent of the means described above and in the same way preventing the detachment of the second end 122 from the reception face 111. The holding means thus restrict the movement of the second end 122 inside the plane of the reception face.

According to a first example illustrated in FIG. 10, the support 110 and the blade 120 are contained in a chamber defining a maximum relaxation volume of the blade 120, for example a chamber defined by the sole 210 in a compact conjoint design of the article 200 and system 100 or a chamber adaptable to a sole 210, for example a chamber comprising attachment means 112 (FIG. 8) or other means enabling it to be associated with the article 200. The chamber is advantageously semi-rigid or flexible and able to contract when the blade 120 is compressed and to extend when the blade 120 relaxes, so as not to interfere with the operation of the system 100 and to preserve the bounce generated by the blade 120, defining a maximum volume in which the chamber can extend and the blade relax.

According to another example illustrated in FIGS. 1 to 3, 8 and 9, a first elastic reinforcement 141 is provided assembled on the support 110 and an intermediate portion of the blade 120, for example a spring assembled between the support 110 and the blade 120 or a deformable elastic surrounding the support 110 and the blade 120. The first elastic reinforcement 141 then generates a force pressing the blade 120 against the support 110. The exact positioning of the first elastic reinforcement 141 is for example adjusted along the support 110 and along the blade 120 so as to prevent the detachment of the second end 122 by providing a minimum force. The first elastic reinforcement 141 is for example also adjusted to provide a least opposition to the relaxation of the blade 120 in a defined angular range or to facilitate or orientate the relaxation of the blade 120 so as to generate a greater bounce, for example so as to facilitate the transfer of forces between the first end 121 and the support 110.

Figure 3:
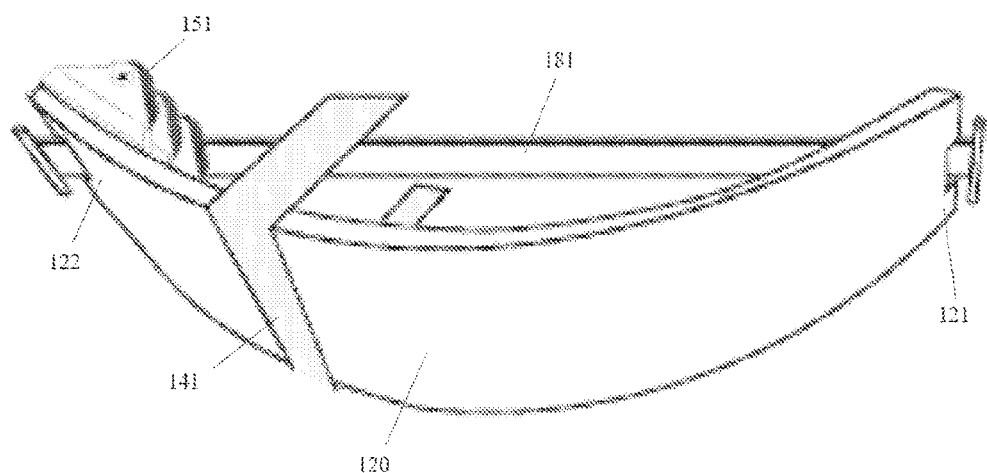
FIG. 3 shows a schematic view of a spring blade of a damping system according to a third example embodiment of the present invention.

According to the example in FIG. 3, a second elastic reinforcement 181 is also provided, for example as a complement to the first elastic reinforcement 141, and balancing the forces coming from the blade 120 and from the first elastic reinforcement 141. In this same example, the second elastic reinforcement 181 extends longitudinally and is assembled with the first end 121 and the second end 122. Obviously, according to the respective design of the blade 120 and of the second elastic reinforcement 181, in particular their configuration at rest, the second elastic reinforcement 181 can oppose the mutual separation of the ends 121, 122 and therefore the compression of the blade 120 by increasing the bounce effect generated by its relaxation or conversely oppose the moving together of the ends 121, 122 and therefore the relaxation of the blade 120 so as to facilitate the compression of the blade 120 and to limit the bounce effects, for example to adapt the use of the system 100 to daily utilisation.

Naturally, to limit losses and avoid oversizing of the system 100, in particular of the blade 120 and of the optional first and second elastic reinforcements 141, 181, means for reducing friction between the second end 122 and the reception face 111 are additionally provided. Such means thus as far as possible facilitate the movement of the second end 122 during the compression and/or relaxation of the blade 120 by limiting the impact of any force generated by the non-elastic elements.

According to a variant embodiment, at least one roller 151 is provided, disposed between the second end 122 and the reception face 111, so that the at least one roller 151 provides the putting in contact and, by its rotation, accompanies the translation movement of the second end 122. This design in particular reduces the friction effects on an axis defined by the orientation of the at least one roller 151, for example on the second axis as defined above. According to the example in FIGS. 1 to 3, a set of bearings is provided using the at least one roller 151, the set of bearings being assembled with the second end 122 and coming into contact with the reception face 111. Obviously, this design can be adapted, and also at least one roller 151 is provided assembled with the reception face 111, the second end 122 coming into contact with the at least one roller 151 and moving with respect thereto, for example along a set of rollers 151 disposed according to the longitudinal range of movement of the second end 122 on the reception face 111. According to yet another design, the reception face 111 has a groove receiving the at least one roller 151, for example in order to restrict the movement of the second end 122 like the first translational guidance means described above and again to bring the second end 122 closer to the support 110.

According to another variant, the damping system 100 comprises an anti-adhesion covering 152 disposed between the second end 122 and the reception face 111, for example disposed on the reception face 111 (FIG. 5), on the second end 122 or on any means serving as an intermediary. This design is in particular easily adaptable to any implementation of the system 100 and makes it possible to obtain a reduction in the omnidirectional friction in the plane of the reception face 111 without impacting the volume of weight of the system 100.

According to yet another variant illustrated in FIGS. 12 to 18, a support 110 is provided comprising a chassis 113 with a U-shaped cross-section and a sliding part 114 with an at least partially rectangular cross-section, the first assembly means, for example the hinge 131, being configured to assemble the first end 121 with the chassis 113, the blade 120 also being assembled at its second end 122 with the sliding part 114 by means of second assembly means, for example via a hinge 137a, 137b assembled with the second end 122 and the sliding part 114 and allowing a rotation movement between the second end 122 and the sliding part 114 on a fourth axis defined by the hinge 137a, 137b. According to this design, the sliding part 114 thus has the reception face 111 with which the second end 122 is put in contact, and the movement of the second end 122 in the plane of the reception face 111 is transmitted to the sliding part 114.

Figure 18:
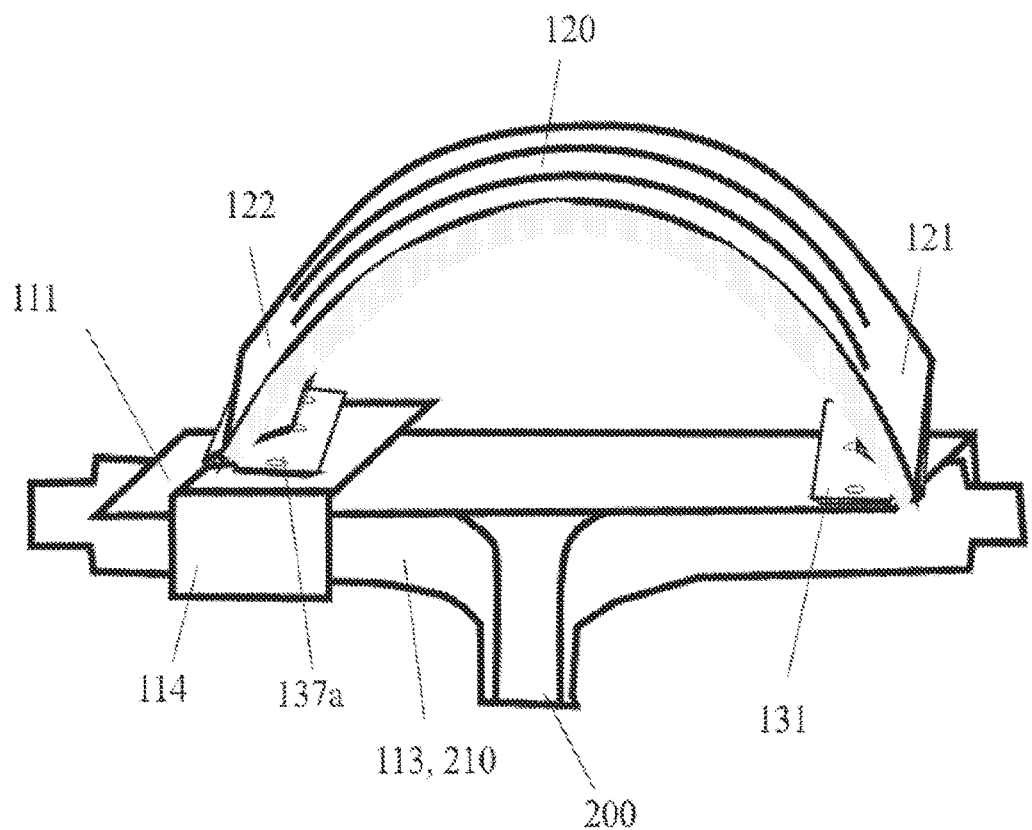
FIG. 18 shows a schematic profile view of an article receiving a damping system according to a fourteenth example embodiment of the present invention.

According to the example in FIG. 18, the chassis 113 of the support 110 is coincident with the sole 210 of the article 200, making it possible to limit the total number of parts and to implement a conjoint design of the article 200 and of the damping system 100. Obviously, variants are also conceived in which the support 110 is fully coincident with the sole 210 of the article 200, different from a design using a support in several elements.

In a similar manner to the first assembly means, a variety of means for implementing second means of assembly between the second end 122 and the sliding part 114 are also provided, selected for example from the same list as stated above corresponding to the assembly means known to a person skilled in the art and comprising among other things a block produced from an elastic material able to freely deform, a half-hinge associated with an element forming a pivot connection, a screw-nut assembly or simple adhesive means. The second assembly means are for example selected in conjunction with the first assembly means, thus having similar features, or independently in accordance with the constraints associated respectively with the assembly of the chassis 113 with the first end 121 and of the sliding part 114 with the second end 122.

In this same variant, the chassis 113 and the sliding part 114 are configured to fit together so as to form translational guidance, the movement of the second end 122 thus being accompanied by the translation of the sliding part 114 with respect to the chassis 113. Advantageously, the U-shaped and rectangular cross-sections extend from a face opposite to the reception face 111, the spring blade 120 thus being able to be compressed to an extreme position corresponding for example to the pressing thereof against the reception face 111 without coming into collision with the rectangular cross section of the chassis 113.

Associating the movement of the second end 122 with the movement of the sliding part 114 on the chassis 113 makes it possible in particular to laterally stiffen the blade 120 while constraining its movement and its twisting to the movements of the sliding part 114. The risks of twisting of the blade 120 outside its compression and relaxation movements are thus greatly reduced.

Figure 12:
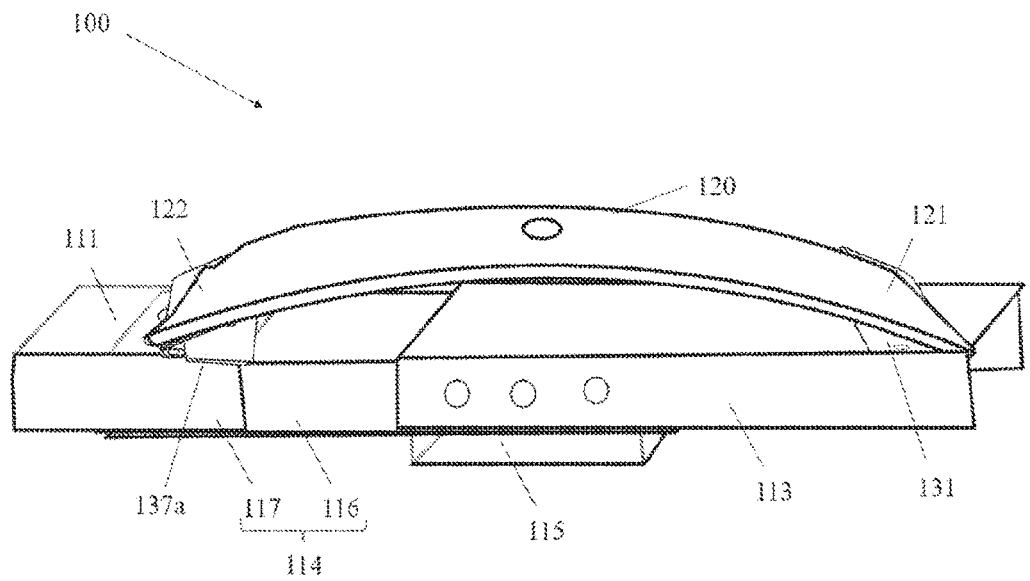
FIG. 12 shows a schematic profile view of a damping system according to an eleventh example embodiment of the present invention.
Figure 13:
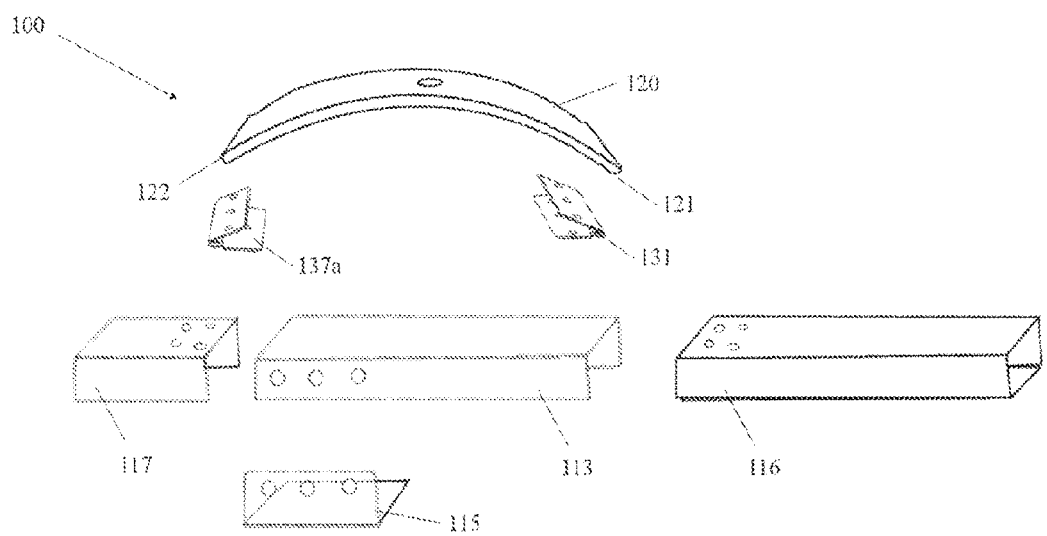
FIG. 13 shows an exploded view of a damping system according to FIG. 12.
Figure 15:
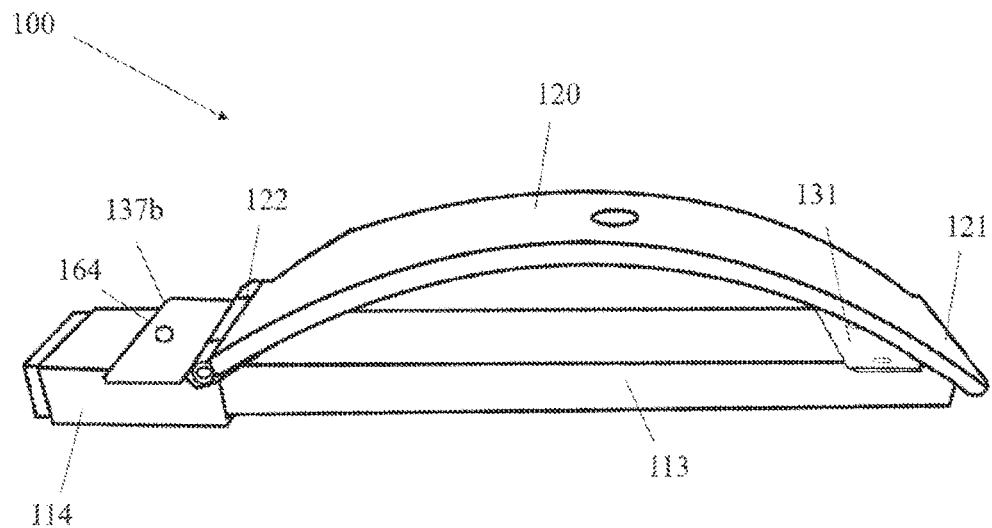
FIG. 15 shows a schematic profile view of a damping system according to a twelfth example embodiment of the present invention.

According to a first design illustrated in FIGS. 12 to 14, the translational guidance is formed solely by the assembly of the chassis 113 and of the sliding part 114, these having complementary shapes, and/or the clearance between the parts being ignored. According to a second design illustrated in FIGS. 15 to 17, second translational guidance means are provided, providing the guidance of the sliding part 114 in relation to the chassis 113 and therefore of the second end 122 with respect to the support 100. The second guidance means also limit the amplitude of the movements of the sliding part 114, in particular so as to keep it fitted together with the chassis 113. Such second guidance means include example a guide 164 assembled with the sliding part 114 and at least one aperture 165 provided on the chassis, receiving the guide 164, so that the guide 164 is constrained in translation along the at least one aperture 165. Such a design also makes it possible, as illustrated in FIG. 15, to combine the second assembly means with the second guidance means in a simplified and compact design, the guide 164 also being assembled with the hinge 137a, 137b so as to slave the second end 122 to the sliding part 114. Such a guide 164 thus corresponds for example to a removable assembly screw for associating the second end 122, the sliding part 114 and the aperture 165, or to a stud or a head extending from the second end 122 or from the hinge 137a, 137b and engaging in the aperture 165 while blocking the sliding part 114.

Obviously, an alternative design is also conceived wherein the second end 122 is firstly associated with the sliding part 114 by second assembly means, and the sliding part 114 guided with respect to the chassis 113 by second guidance means distinct from the second assembly means, for example comprising two apertures provided on the lateral edges of the chassis 113 and a rod extending between the two apertures and assembled with the sliding part 114. Such a design makes it possible in particular to select second assembly means and second guidance means independently so as better to respond to their respective constraints.

According to a variant illustrated in FIGS. 12 to 14, the sliding part 114 includes a first portion 116 having a rectangular cross-section and configured to fit in the chassis 113 and a second portion 117 having a U-shaped cross-section. This design makes it possible in particular, according to the example in FIG. 14, to associate the second damping system 100 with an article 200 including several independent means, for example a body 250 assembled with a central portion of the damping system 100, here a central portion of the spring blade 120, as well as anterior and posterior movement means 241, 242, by disposing them on either side of the support 110 formed by the chassis 113 and the sliding part 114 while benefiting from the U-shaped cross-section for securing the independent means in a compact manner. The stability of the article 200 is then maximised by disposing the anterior movement means 241 at a first end and the posterior movement means 242 at a second end, while the height occupied by the first portion 116 is masked.

So as to restrict any rotation of the first portion 116 in the chassis 113, which is partially open, or more generally any rotation of the sliding part 114 in the chassis 113 when it comes to fit inside the chassis 113, a guide part 115 is provided, which has a U-shaped or V-shaped cross-section, corresponding then to a square part. The guide part 115 is assembled with the chassis 113 so as to block the movement of the sliding part 114 on an axis perpendicular to the second axis, and by extension any rotation movement beyond a predefined clearance when the blade 120 compresses and/or relaxes. In other words, the sliding part 114 is then fitted between the chassis 113 and the guide part 115 and able to slide between these two elements.

As illustrated in FIG. 13, a first portion 116 and a second portion 117 are provided, produced as two distinct elements, these subsequently being assembled so as to form the sliding part 114. The second portion 117 has for example a cross-section identical to that of the chassis 113, the reception face 111 defined by the second portion 117 then extending in the same plane as one of the faces of the chassis 113 and making it possible to balance the structure of the support 110 for receiving the blade 120 and/or the article 200.

Figure 16:
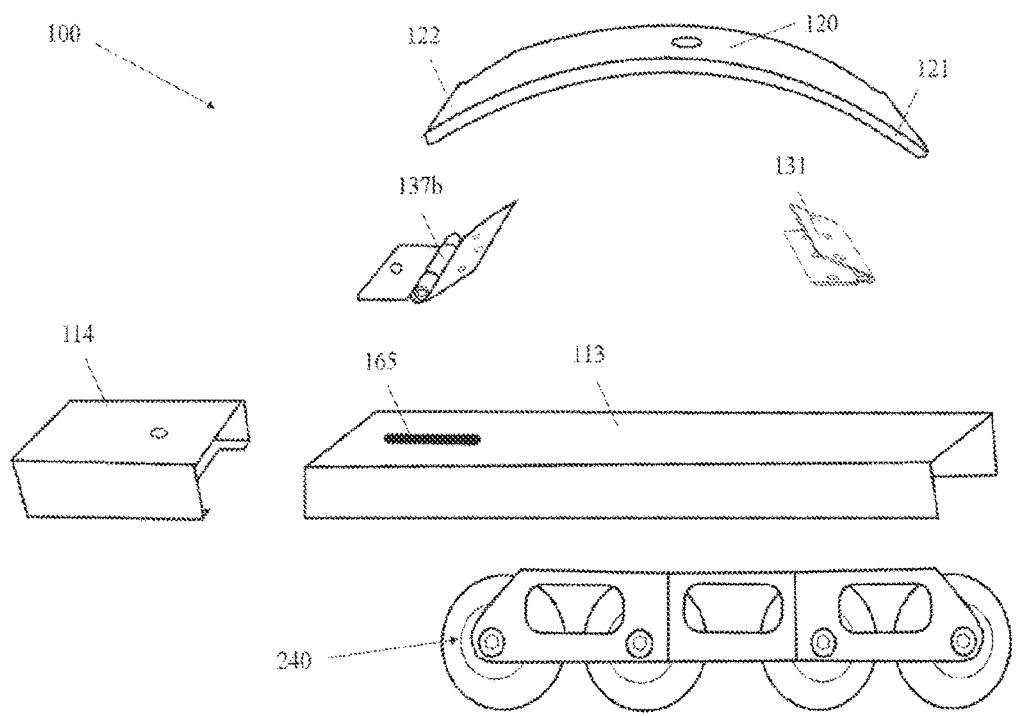
FIG. 16 shows an exploded view of a damping system according to FIG. 15.
Figure 17:
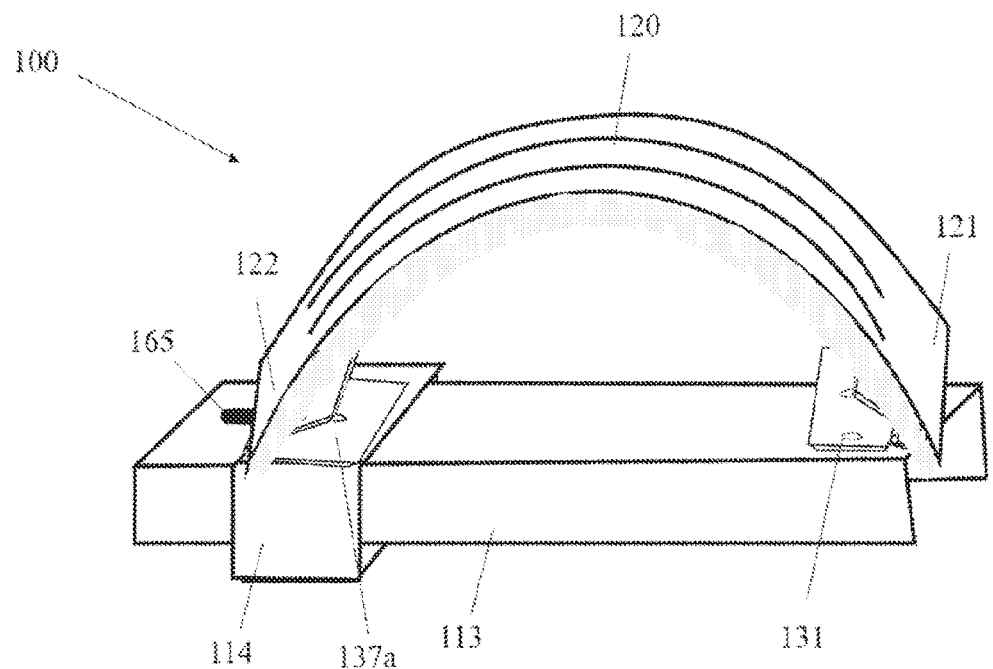
FIG. 17 shows a schematic profile view of a damping system according to a thirteenth example embodiment of the present invention.

According to another variant illustrated in FIGS. 15 to 17, the sliding part 114 fits around the chassis 113, thus avoiding any risk of rotation of the sliding part 114 beyond the assembly clearance and simplifying the design of the sliding part 114. A plurality of designs are also provided for adapting the geometry of the damping system according to its assembly with the article 200 and preserving the compactness of the article 200 equipped with the damping system 100 while allowing reception thereof inside the U-shaped cross-section of the chassis 113, in particular a first design wherein the sliding part 114 is disposed longitudinally in line with the second end 122 (FIG. 15), thus maximising the length according to which the chassis 113 is free without being obstructed by the sliding part 114 and therefore the space available for the assembly of the article 200 and/or of a single part of the article 200, in particular movement means 240 forming a single-piece element (FIG. 16). In another design for reducing the length of the damping system to that of the blade 120 according to the most compressed position thereof, the sliding part 114 is fitted on the chassis 113 in a longitudinal portion coincident with the second end 122 (FIG. 17), i.e. the sliding part 114 does not excessively extend from the chassis 113 beyond the need to effect contacting of the second end 112.

Obviously, the choice of the positioning of the sliding part 114 is conjoint with that of the second assembly means, these corresponding for example to a hinge 137a, 137b having alternatively an acute (137a) or obtuse (137b) internal angle.

Thus it will be understood that the present invention provides a damping system for an article, for example a footwear article, making it possible to absorb shocks and to generate propulsion in return, while being more compact and allowing more varied movements than the existing solutions. This damping system is in particular adapted for association thereof with a footwear article for the purpose of accompanying walking, running or jumping movements, but can naturally also be incorporated and sized for a variety of articles benefiting from compact damping, such as suspension systems, saddlery or bedding articles, and/or reproducing similar movements, for example bicycle or gyropode pedals or prostheses or artificial limbs.

It should be observed that this detailed description relates for example to a particular embodiment of the present invention, but that in no case does this description have any character limitative of the object of the invention, quite the contrary, its objective is to remove any imprecision or any faulty interpretation of the following claims.

It should also be observed that the reference signs put between parentheses in the following claims do not in any case have a limitative character; the sole purpose of these signs is to improve intelligibility and comprehension of the following claims as well as the scope of the protection sought.

The invention claimed is:
1. A dampening system for an article, comprising:
a rigid support having at least one face, referred to as a reception face, extending in a plane, wherein the rigid support has at least partially a U-shaped cross-section, forming a groove;
a spring blade having a first end and a second end, said spring blade having a curved shape between said ends;
a longitudinal second elastic reinforcement assembled with the first end and the second end; and
first assembling means of assembling said first end with said rigid support, said spring blade extending along said rigid support on a convex path so that said second end is put in contact with the groove of said reception face and is able to move in said plane during compression and/or relaxation of said spring blade.

2. The dampening system according to claim 1, further comprising first guidance means for guiding said second end in translation with respect to a lateral edge of the U-shaped cross-section of the rigid support along said reception face, wherein said first guidance means includes a second guiding rod assembled with said second end and at least one aperture provided on said lateral edge of the U-shaped cross-section of the rigid support, said at least one aperture receiving said second guiding rod and providing translation thereof along the at least one aperture, wherein said second guiding rod corresponds to a removable pin.

3. The dampening system according to claim 2, wherein said first guidance means include two lateral guides assembled with said rigid support and disposed on either side of said reception face.

4. The dampening system according to claim 1, wherein said first assembling means include a first part having, on a first distal portion, a U-shaped cross-section forming an opposition to said groove, said first part being assembled on said rigid support on to a first proximal portion by means of at least one first stud passing through said rigid support and said first part, said first end being disposed between said at least one first stud and said first distal portion.

5. The dampening system according to claim 4, wherein said first assembling means further comprises a removable pin passing through said rigid support and said first part and disposed between said at least one first stud and said first distal portion, said first end being disposed between said at least one first stud and said pin.

6. The dampening system according to claim 4, wherein the first assembling means further comprises a second part having, on a second distal portion, a U-shaped cross-section forming an opposition to said groove, said second part being assembled on said rigid support on a first proximal portion by means of at least one second stud passing through said rigid support and said second part, said second end being disposed between said at least one second stud and said second distal portion.

7. The dampening system according to claim 1, wherein said rigid support comprises a chassis and a sliding part, said chassis having a U-shaped cross-section and said sliding part having at least partially a rectangular cross-section, said chassis and said sliding part being configured to fit together so as to form a guide in translation on an axis parallel to the axis of movement of said second end, said first assembling means configured to assemble said first end with said chassis, said damping dampening system further comprising second assembling means of assembling said second end with said sliding part, said U-shaped and rectangular cross sections extending from a face opposite to said reception face.

8. The dampening system according to claim 7, wherein said chassis fits on said sliding part, said rigid support further comprising a guide part having a cross-section in a square or in a U, said guide part being assembled with said chassis and creating an adaptation of said sliding part in said chassis.

9. The dampening system according to claim 7, wherein said sliding part comprises a first portion having a rectangular cross-section and fitting together with said chassis, said sliding part including a second portion having a U-shaped cross-section.

10. The dampening system according to claim 9, wherein said first portion at said second portion form two distinct elements assembled together.

11. The dampening system according to claim 10, wherein said second assembling means comprises:
a hinge assembled with said second end and said sliding part.

12. The dampening system according to claim 7, wherein said sliding part is fitted together with said chassis longitudinally in line with said second end.

13. The dampening system according to claim 7, wherein said sliding part is fitted together with said chassis in a portion of said chassis longitudinally coincident with said second end.

14. An article including at least one sole receiving a dampening system according to claim 1.

15. The article according to claim 14, said article being of a footwear article type, for which said means of assembling said dampening system are disposed at a heel of said footwear article, said blade extending towards a front of said footwear article.

16. The article according to claim 14, further comprising a set of movement means including first movement means and second movement means assembled together by means of said dampening system, said dampening system extending longitudinally between said first and second movement means.

17. The article according to claim 14, further comprising a body assembled with a central portion of said dampening system, wherein said body is assembled with said central portion so as to allow rotation of said dampening system with respect to said body on a substantially vertical axis.

18. The article according to claim 16, further comprising a plurality of sets of movement means and receives a plurality of dampening systems, each dampening damping system being respectively associated with a set of movement means and allowing the assembly of said first movement means and of said second movement means of said set of movement means.

19. The dampening system according to claim 7, wherein said second assembling means comprises a block produced from an elastic material assembled with said second end and said sliding part.

20. The dampening system according to claim 7, wherein said second assembling means comprises a half-hinge assembled with said second end and a pivot connection arranged between said half-hinge and said sliding part.

21. The dampening system according to claim 7, wherein said second assembling means comprises a screw-nut assembly assembled with said second end and said sliding part.

* * * * *